(12) United States Patent
Baba et al.

(10) Patent No.: US 11,065,966 B2
(45) Date of Patent: Jul. 20, 2021

(54) APPARATUS FOR CONTROLLING MOTORIZED VEHICLE

(71) Applicant: DENSO CORPORATION, Kariya (JP)

(72) Inventors: Kousuke Baba, Kariya (JP); Shigeru Maeda, Kariya (JP); Chinatsu Washizu, Kariya (JP)

(73) Assignee: DENSO CORPORATION, Kariya (JP)

( * ) Notice: Subject to any disclaimer, the term of this patent is extended or adjusted under 35 U.S.C. 154(b) by 306 days.

(21) Appl. No.: 16/285,545

(22) Filed: Feb. 26, 2019

(65) Prior Publication Data
US 2019/0263275 A1  Aug. 29, 2019

(30) Foreign Application Priority Data
Feb. 28, 2018 (JP) .............................. JP2018-035764

(51) Int. Cl.
*B60L 50/60* (2019.01)
*B60L 50/51* (2019.01)
*B60L 15/20* (2006.01)
*B60L 1/00* (2006.01)

(52) U.S. Cl.
CPC ................ *B60L 50/60* (2019.02); *B60L 1/00* (2013.01); *B60L 15/2045* (2013.01); *B60L 50/51* (2019.02); *B60L 2210/10* (2013.01); *B60L 2240/421* (2013.01); *B60L 2240/429* (2013.01)

(58) Field of Classification Search
CPC ...... B60L 50/60; B60L 50/51; B60L 15/2045; B60L 1/00; B60L 2240/429; B60L 2210/10; B60L 2240/421; Y02T 10/70; Y02T 10/64; Y02T 10/72
See application file for complete search history.

(56) References Cited

U.S. PATENT DOCUMENTS

| 9,168,915 | B2* | 10/2015 | Amano ................. | B60W 20/00 |
| 9,168,916 | B2* | 10/2015 | Park ...................... | B60W 20/12 |
| 9,868,358 | B2* | 1/2018 | Kono ..................... | B60L 58/12 |
| 10,081,354 | B2* | 9/2018 | Sato ....................... | B60L 58/21 |
| 10,164,522 | B2* | 12/2018 | Kashyap ................ | H02M 3/04 |
| 10,259,342 | B2* | 4/2019 | Oyanagi ................. | H02M 3/158 |
| 2002/0167291 | A1* | 11/2002 | Imai ....................... | H02J 7/1423 |
| | | | | 320/119 |
| 2012/0123624 | A1* | 5/2012 | Sato ....................... | B60L 50/51 |
| | | | | 701/22 |

(Continued)

*Primary Examiner* — Nha T Nguyen
(74) *Attorney, Agent, or Firm* — Oliff PLC

(57) ABSTRACT

In an apparatus for controlling a motorized vehicle equipped with a main rechargeable battery, electrical loads electrically connected to the main rechargeable battery via a voltage converter, a converter operating point setter is configured to, when current is passing between the main rechargeable battery and the electrical loads, based on a charging/discharging amount of the main rechargeable battery, set operating points of the voltage converter, each specifying a power conversion efficiency representing a ratio of input power to the electrical loads to output power of the main rechargeable battery and an output current of the voltage converter. A converter controller is configured to, based on the operating point set by the converter operating point setter, cause the voltage converter to convert the voltage of the main rechargeable battery, thereby supplying power to the electrical loads.

7 Claims, 14 Drawing Sheets

(56) References Cited

U.S. PATENT DOCUMENTS

| | | | | |
|---|---|---|---|---|
| 2012/0123625 A1* | 5/2012 | Ueo | ............. | B60L 58/12 |
| | | | | 701/22 |
| 2012/0187759 A1* | 7/2012 | Kamichi | ............. | B60L 50/51 |
| | | | | 307/10.1 |
| 2012/0262113 A1* | 10/2012 | Sheu | ............. | H02M 1/4225 |
| | | | | 320/109 |
| 2012/0268044 A1* | 10/2012 | Shvartsman | ............. | B60L 58/21 |
| | | | | 318/139 |
| 2012/0306263 A1* | 12/2012 | Tashiro | ............. | B60L 58/20 |
| | | | | 307/9.1 |
| 2013/0134908 A1* | 5/2013 | Sugiyama | ............. | B60L 58/40 |
| | | | | 318/3 |
| 2013/0169039 A1* | 7/2013 | Zhu | ............. | H02M 3/33592 |
| | | | | 307/10.1 |
| 2013/0175858 A1* | 7/2013 | Sakurai | ............. | B60L 1/00 |
| | | | | 307/9.1 |
| 2013/0249283 A1* | 9/2013 | Yokoyama | ............. | B60L 1/00 |
| | | | | 307/10.1 |
| 2015/0019055 A1* | 1/2015 | Nie | ............. | H02J 7/342 |
| | | | | 701/22 |
| 2016/0089986 A1* | 3/2016 | Maeno | ............. | B60L 53/14 |
| | | | | 320/101 |
| 2016/0280208 A1* | 9/2016 | Yamauchi | ............. | B60W 10/06 |
| 2017/0036554 A1* | 2/2017 | Kumazawa | ............. | B60W 20/15 |
| 2017/0358987 A1* | 12/2017 | Oouchi | ............. | B60L 53/14 |
| 2019/0263272 A1 | 8/2019 | Washizu et al. | | |
| 2019/0267919 A1 | 8/2019 | Suzuki et al. | | |

* cited by examiner

APPARATUS FOR CONTROLLING MOTORIZED VEHICLE

CROSS-REFERENCE TO RELATED APPLICATION

This application is based on and claims the benefit of priority from earlier Japanese Patent Application No. 2018-35764 filed on Feb. 28, 2018, the description of which is incorporated herein by reference.

BACKGROUND

Technical Field

This disclosure relates to an apparatus for controlling a motorized vehicle.

Related Art

Conventionally, in a motorized vehicle, such as an electric vehicle, a traction motor may be supplied with electrical power from a high-voltage battery. Accessories, such as headlights, may be supplied with electrical power from a low-voltage battery. In such a motorized vehicle, a DC-to-DC converter is connected between the high-voltage battery and the low-voltage battery. The DC-to-DC converter steps down a voltage of the high-voltage battery to charge the low-voltage battery. However, to reduce power consumption, it is desirable to operate the DC-to-DC converter at high efficiency.

There is a need for an apparatus for controlling a motorized vehicle, which can reduce power consumption.

SUMMARY

One aspect of the present disclosure provides an apparatus for controlling a motorized vehicle equipped with a main rechargeable battery, and electrical loads electrically connected to the main rechargeable battery via a voltage converter. In the apparatus, a converter operating point setter is configured to, when current is passing between the main rechargeable battery and the electrical loads, based on a charging/discharging amount of the main rechargeable battery, set operating points of the voltage converter, each specifying a power conversion efficiency representing a ratio of input power to the electrical loads to output power of the main rechargeable battery and an output current of the voltage converter. A converter controller is configured to, based on the operating point set by the converter operating point setter, cause the voltage converter to convert the voltage of the main rechargeable battery, thereby supplying power to the electrical loads.

DESCRIPTION OF SPECIFIC EMBODIMENTS

Figure 1:
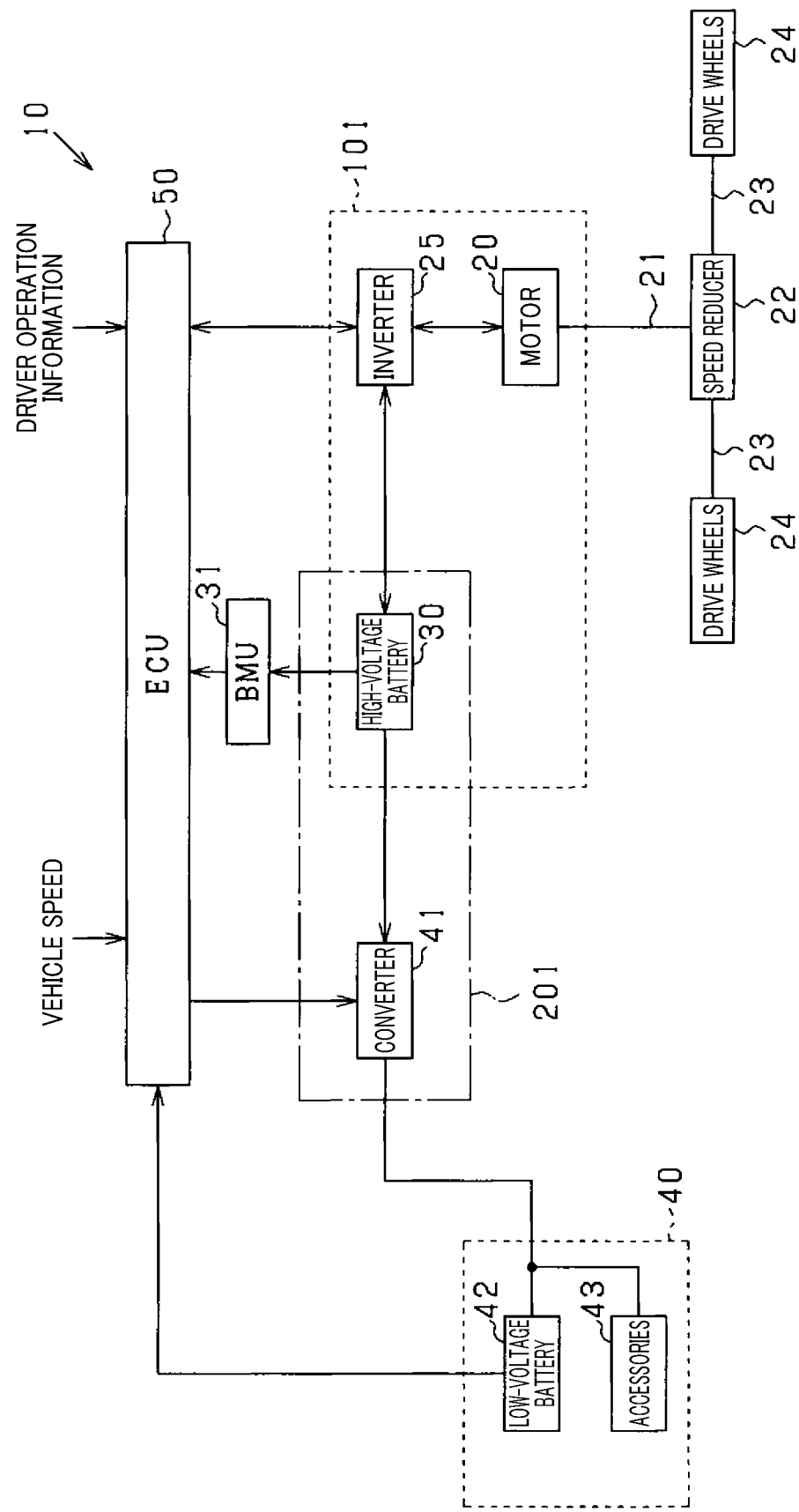
FIG. 1 is a schematic diagram of a vehicle.

Hereinafter, exemplary embodiments of the present disclosure will be described in detail with reference to the accompanying drawings, in which like reference numerals refer to like or similar elements and duplicated description thereof will be omitted.

First Embodiment

A first embodiment of the present disclosure provides an apparatus for controlling an electric vehicle (i.e., a motorized vehicle) that is driven by a motor using electrical power supplied from a high-voltage battery.

As shown in FIG. 1, the electric vehicle (hereinafter referred to as a vehicle 10) includes a motor 20 that is a vehicle prime mover, a rechargeable high-voltage battery 30, and electrical loads 40 connected to the high-voltage battery 30, and an ECU 50 as an apparatus for controlling the electric vehicle.

The motor 20, which is a rotary electric machine that serves as an electric motor and power generator, is a synchronous three-phase alternating-current (AC) motor using a permanent magnet or the like. A rotary shaft 21 of the motor 20 is mechanically coupled via a speed reducer 22 to axles 23 as drive shafts. When the motor 20 serves as an electric motor, a motor torque causes the rotary shaft 21 and the axles 23 coupled to the rotary shaft 21 to rotate, thereby rotates drive wheels 24 fitted to the axles 23. When the motor 20 serves as a power generator during deceleration of the vehicle 10, the motor 20 effects regenerative braking to inhibit rotation of the drive wheels 24. The motor 20 converts kinetic energy of the drive wheels 24 to electrical power to charge or collect the electrical power in the high-voltage battery 30. The motor 20 performs electrical power regeneration during deceleration of the vehicle 10.

The motor 20 is connected to the high-voltage battery 30 via the inverter 25 that is a power conversion circuit. When the motor 20 serves as an electric motor, the inverter 25, in response to a command from the ECU 50, supplies electrical power from the high-voltage battery 30 to the motor 20, which effects power-running driving of the motor 20. When the motor 20 serves as a power generator, the inverter 25, in response to a command from the ECU 50, causes the motor 20 to perform electrical power regeneration, thereby supplying a generated voltage to the high-voltage battery 30.

The high-voltage battery 30 is a main rechargeable battery. An output voltage of the high-voltage battery 30 is within a range of 100 to 400 volts (V). Examples of the high-voltage battery 30 may include, but are not limited to, a lithium-ion battery and a nickel-hydrogen battery.

The high-voltage battery 30 is connected to a battery management unit (BMU) 31. The BMU 31 is configured to monitor a state of the high-voltage battery 30 and acquires information regarding the high-voltage battery 30. For example, the BMU 31 acquires a state of charge (SOC) and/or a temperature of the high-voltage battery 30 as information regarding the high-voltage battery 30. The BMU 31 outputs the acquired information regarding the high-voltage battery 30 to the ECU 50. In an alternative embodiment, the ECU 50 may serve as the BMU 31.

The electrical loads 40 are connected to the high-voltage battery 30 via a DC-to-DC converter 41 that corresponds to a voltage converter. The electrical loads 40 include a low-voltage battery 42 connected to the converter 41 and accessories 43 connected to the converter 41.

The converter 41 is a buck converter configured to step down a high-voltage current supplied from the high-voltage battery 30 and output the stepped down voltage. The converter 41 outputs an amount of current in accordance with a command from the ECU 50. The converter 41 consumes electrical power to convert the voltage, which leads to losses.

The low-voltage battery 42 is a rechargeable battery. The low-voltage battery 42 has an output voltage of 12 volts (V). Examples of the low-voltage battery 42 may include a lead-acid battery. The low-voltage battery 42 is rechargeable with electrical power supplied from the high-voltage battery 30 via the converter 41. The low-voltage battery 42 is an electrical load when charged. A state of the low-voltage battery 42 is monitored by the ECU 50 such that information regarding the low-voltage battery 42 is input to the ECU 50. For example, the ECU 50 acquires a state of charge (SOC) of the low-voltage battery 42 as information regarding the low-voltage battery 42.

The accessories 43 include plural types of low-voltage accessories. The low-voltage accessories may include, but are not limited to, a head lamp, an audio device, a radiator fan, an air conditioner blower, and a water pump. The accessories 43 can be powered by the high-voltage battery 30 via the converter 41. The accessories 43 are also connected to the low-voltage battery 42 such that the low-voltage battery 42 can also be powered by the low-voltage battery 42. The low-voltage battery 42 corresponds to a rechargeable battery.

The ECU 50 may be formed of one or more microcomputers, each incorporating therein a central processing unit (CPU) and non-transitory computer readable media (in the present embodiment, collectively referred to as a memory), such as a random access memory (RAM), a read only memory (ROM), and flash, etc. This ECU 50 is operable to acquire a variety of information.

For example, the ECU 50 acquires driver operation information from various sensors, such as an accelerator sensor configured to detect an accelerator actuation amount (e. g., an accelerator pedal depression amount) and a brake sensor configured to detect a brake actuation amount (e. g., a brake pedal depression amount). The ECU 50 acquires information regarding the high-voltage battery 30 from the BMU 31. The ECU 50 acquires information regarding the motor 20 (for example, a rotational speed of the motor 20) from the inverter 25. The ECU 50 acquires information regarding the vehicle 10 from various sensors, such as a vehicle speed from a vehicle speed sensor. The ECU 50 acquires information regarding the low-voltage battery 42, such as an SOC of the low-voltage battery 42, and information regarding a drive state of each of the accessories 43, from the electrical loads 40.

The ECU 50 performs various control based on the acquired variety of information. The ECU 50 controls power-running driving and electrical power regeneration of the motor 20 via the inverter 25.

It is known that, when the motor 20 serves as an electric motor or as a power generator, the motor efficiency varies with rotational speed and motor torque of the motor 20.

The motor efficiency is a ratio (in %) of input/output dynamical power (rotational speed×torque) of the motor 20 to input/output power (voltage×current) of the motor 20. More specifically, during power-running driving, the motor efficiency is a ratio (in %) of output dynamical power from the motor 20 to input electrical power to the motor 20. During electrical power regeneration, the motor efficiency is a ratio (in %) of output electrical power from the motor 20 to input dynamical power to the motor 20.

Figure 2:
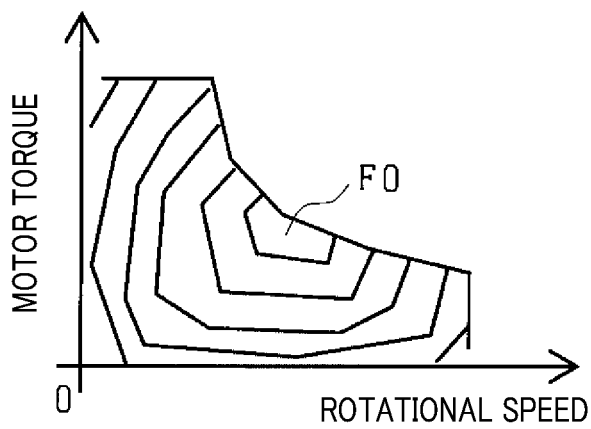
FIG. 2 is an example motor efficiency map.

For example, FIG. 2 illustrates an example motor efficiency map (map data). In the motor efficiency map of FIG. 2, the motor efficiency is defined as a function of parameters that are a rotational speed and a motor torque of the motor 20. In this motor efficiency map, the motor efficiency is constant in each of regions indicated by contour lines. One of such regions, in which the motor efficiency takes a highest value, is referred to as a high efficiency region F0. The motor efficiency decreases as a distance from the high efficiency region F0 increases.

The motor efficiency map as shown in FIG. 2 can be acquired by experiment or simulation. FIG. 2 illustrates the motor efficiency map for positive motor torques (that is, motor torques during power-running driving). A similar motor efficiency map can be acquired for negative motor torques (that is, motor torques during electrical power regeneration).

Conventionally, to efficiently control the motor 20, the motor 20 is controlled based on the high efficiency region F0 in the motor efficiency map. However, the motor efficiency map shown in FIG. 2 does not take into account losses in the high-voltage battery 30 and the inverter 25. The battery loss in the high-voltage battery 30 is calculated by multiplying a square of an amount of current flowing through the high-voltage battery 30 (an amount of current during charge/discharge of the high-voltage battery 30) by the battery resistance of the high-voltage battery 30. The loss in the inverter 25 is proportional to an amount of current therethrough and the circuit resistance.

Considering the power system 101 as a whole, it is desirable to efficiently control the motor 20 taking into account not only the motor efficiency, but also losses in the high-voltage battery 30 and the inverter 25. When current is passing between the high-voltage battery 30 and the motor 20 via the inverter 25, it is desirable to control the motor 20 taking into account the system efficiency indicative of a ratio of input/output dynamical power of the motor 20 to input/output electrical power of the high-voltage battery 30. The system efficiency refers to the efficiency of the whole power system 101 including the high-voltage battery 30, the inverter 25, and the motor 20, but not including the converter 41 and the electrical loads 40.

In view of the above, in the present embodiment, a system efficiency map that allows the system efficiency to be determined as a function of a rotational speed and a motor torque is created and stored in the memory of the ECU 50.

Given a rotational speed and a motor torque, input power of the motor 20 during power-running driving and output power of the motor 20 during power generation are uniquely determined. Therefore, when supply of power to the electrical loads 40 is not involved, that is, when an amount of current output from the high-voltage battery 30 to the electrical loads 40 is zero, the system efficiency map can be determined uniquely. The system efficiency map can be determined by experiment or simulation.

Figure 3:
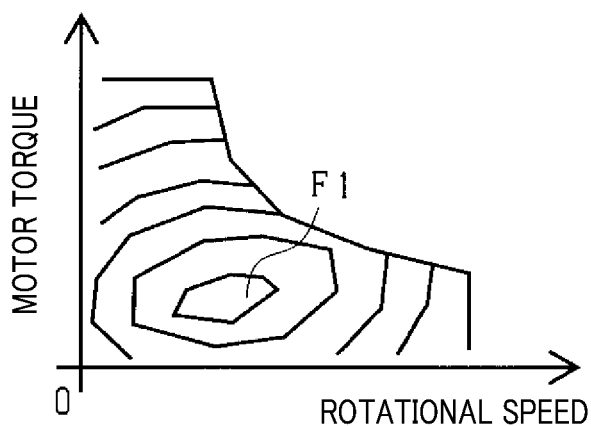
FIG. 3 is an example system efficiency map.

FIG. 3 illustrates an example system efficiency map. The system efficiency map of FIG. 3 is determined as a function of the rotational speed and the motor torque of the motor 20. In this system efficiency map, each region delimited by contours has a constant system efficiency. The high efficiency region F1, which is one of the regions, indicates that the system efficiency takes a highest value. The system efficiency decreases as a distance from the high efficiency region F1 increases. The system efficiency map shown in FIG. 3 is for positive motor torques. The system efficiency map for negative motor torques is similar to the map of FIG. 3.

In order to efficiently control the motor 20, the ECU 50 references the system efficiency map to identify a motor operating point in the high efficiency region F1 from motor operating points specifying the system efficiency, the motor torque, and the rotational speed. The ECU 50 may only control the motor 20 using the rotational speed and the motor torque identified by the motor operating point in the high efficiency region F1. In doing so, the vehicle speed (that is, the rotational speed of the motor 20) needs to comply with a driver's request. However, when controlling the motor 20 using the motor operating point in the high efficiency region F1, the motor torque may be excessive for the driver's request.

In view of the above, in the present embodiment, the ECU 50 is configured to intermittently operate the motor 20. More specifically, the ECU 50 periodically alternates between a motor driving period, in which the vehicle 10 is driven or braked, and a coasting period, in which the vehicle 10 is coasting (where an output torque of the motor 20 is set to zero or near zero). The ECU 50 sets an average torque of the motor 20 over one period of operating cycle having one motor driving period and one coasting period set therein to be equal to a requested torque, thereby meeting the driver's request.

When controlling the motor 20 to operate at the motor operating point in the high efficiency region F1, the motor torque may be equal to or below the requested torque. In such a case, regardless of the system efficiency (even if the system efficiency can not be improved), the ECU 50 controls the motor 20 by putting a priority on the driver's request and outputting a motor torque corresponding to the requested torque, where the motor 20 is continuously operated without being intermittently operated.

In the present embodiment, the high-voltage battery 30 is electrically connected not only to the motor 20, but also to the electrical loads 40. Electrical power is supplied from the high-voltage battery 30 to the electrical loads 40 regardless of the presence of the motor 20. Therefore, for example, depending on drive states of the accessories 43, an amount of current flowing through the high-voltage battery 30 may increase or decrease regardless of the state of the motor 20. Also, depending on the SOC of the low-voltage battery 42, an amount of current flowing through the high-voltage battery 30 may increase or decrease regardless of the state of the motor 20. Battery losses may vary with the amount of current flowing through the high-voltage battery 30 for supply of power to the electrical loads 40, which may affect the system efficiency of the power system 101.

In the present embodiment, motor operating points, each of which can be identified by the system efficiency, the rotational speed, and the motor torque that are taken as parameters, are set based on amounts of current flowing through the high-voltage battery 30. More specifically, for each amount of current flowing through the high-voltage battery 30 for supply of power to the electrical loads 40, a curve (map) connecting motor operating points of highest system efficiency is stored in the memory of the ECU 50. The ECU 50 acquires an amount of current flowing through the high-voltage battery 30 for supply of power to the electrical loads 40, and based on the acquired amount of current, read the curve connecting motor operating points where the system efficiency is highest. Based on the motor operating points indicated by this curve, the ECU 50 determines the motor torque and the rotational speed that comply with a driver's request.

Figure 4:
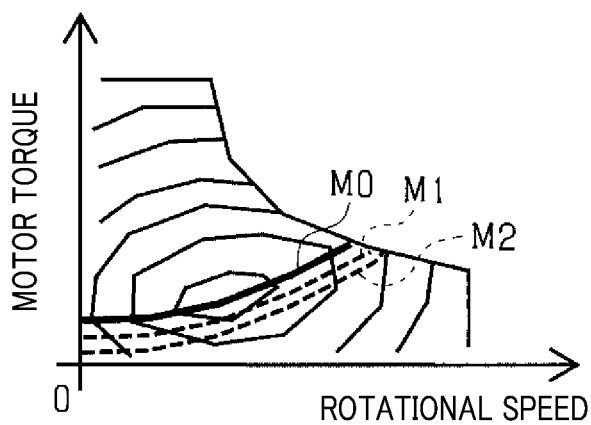
FIG. 4 is an example system efficiency map for each amount of current.

FIG. 4 illustrates an example curve connecting motor operating points of highest system efficiency for each amount of current flowing through the high-voltage battery 30. In FIG. 4, the curve M0 is a curve when the amount of current flowing through the high-voltage battery 30 for supply of power to the electrical loads 40 is zero. The curve M1 is a curve when the amount of current through the high-voltage battery 30 for supply of power to the electrical loads 40 is A1 (>0). The curve M2 is a curve when the amount of current flowing through the high-voltage battery 30 for supply of power to the electrical loads 40 is A2 (>A1).

FIG. 4 illustrates a map when the motor torque is positive. A map when the motor torque is negative is similar to the map when the motor torque is positive. Also in such a case, for each amount of current flowing through the high-voltage battery 30, as shown in FIG. 4, the system efficiency map indicating motor operating points, each of which can be identified by the system efficiency, the rotational speed, and the motor torque, may be created and stored. The motor 20 may be controlled based on the system efficiency map.

Figure 5:
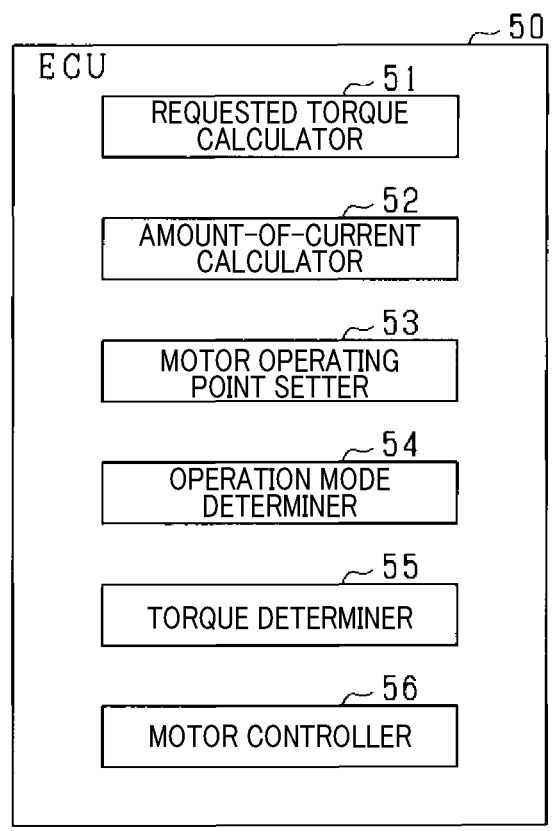
FIG. 5 is a functional block diagram of an ECU in accordance with a first embodiment.

The ECU 50 has various functions described below to effectively perform power-running driving and electrical power regeneration in the manner set forth above. That is, as shown in FIG. 5, the ECU 50 includes, as functional blocks, a requested torque calculator 51, an amount-of-current calculator 52, a motor operating point setter 53 that serves as a machine operating point setter, an operation mode determiner 54, a torque determiner 55, a motor controller 56 that serves as a rotary electric machine controller. Functions of these functional blocks are implemented by at least one computer formed of a central processing unit (CPU), a random access memory (RAM), a read-only member (ROM), an input/output (I/O) interface and other components, executing computer programs stored in the ROM or the like. These functional blocks may be implemented by an electronic circuit which is hardware, or may at least partially be implemented by software to be executed on the computer.

The requested torque calculator 51 calculates a requested torque that the motor 20 is requested to output based on driver operation information and the vehicle speed. The driver operation information is information regarding an accelerator actuation amount and a brake actuation amount. In general, during power-running driving (during acceleration), the requested torque is positive. During power generation (during deceleration or during acceleration off), the requested torque is negative.

The vehicle speed may be acquired from a speed sensor. In the present embodiment where the own vehicle is an electric vehicle, the ECU 50 may acquire a rotational speed of the motor 20, and based on the rotational speed of the motor 20, calculate the vehicle speed.

The amount-of-current calculator 52 calculates an amount of current flowing through the high-voltage battery 30. More specifically, the amount-of-current calculator 52 calculates an amount of discharge current of the high-voltage battery 30 caused by supply of power to the electrical loads 40. That is, the amount-of-current calculator 52 calculates a sum of an amount of current responsive to requests from the accessories 43 and an amount of charge current to the low-voltage battery 42, thereby calculating the amount of discharge current of the high-voltage battery 30 caused by supply of power to the electrical loads 40.

The amount of current responsive to requests from the accessories 43 can be estimated by map calculation based on drive states of the accessories 43. The amount of charge current to the low-voltage battery 42 can be estimated by map calculation based on the SOC of the low-voltage battery 42.

The amount of charge current to the low-voltage battery 42 can be considered constant as compared with the amount of current responsive to requests from the accessories 43. Therefore, the amount of charge current to the low-voltage battery 42 may be set to a predetermined value. When the amount of charge current to the low-voltage battery 42 is constant, influence of the amount of charge current to the low-voltage battery 42 may previously be reflected to the system efficiency map. That is, the system efficiency map may be created taking into account battery losses in the high-voltage battery 30 based on the discharge current to the low-voltage battery 42. If the amount of charge current to the low-voltage battery 42 is significantly small as compared with the amount of current responsive to requests from the accessories 43, the amount of charge current to the low-voltage battery 42 may be ignored.

The motor operating point setter 53 sets a motor operating point that can be identified by the system efficiency, the motor torque, and the rotational speed, based on the amount of current flowing through the high-voltage battery 30 calculated by the amount-of-current calculator 52. In the present embodiment, the motor operating point setter 53 reads or sets a curve connecting motor operating points of highest system efficiency as a function of the amount of current.

The operation mode determiner 54 is configured to, during a motor driving period, determine whether to operate the motor 20 intermittently (or perform the intermittent operation) such that a coasting period is periodically repeated. More specifically, the operation mode determiner 54 calculates a rotational speed of the motor 20 based on the acquired vehicle speed. Based on the curve set by the motor operating point setter 53 connecting motor operating points of highest system efficiency, the operation mode determiner 54 determines a motor operating point corresponding to the rotational speed. The operation mode determiner 54 compares the motor torque identified by the motor operating point and the requested torque calculated by the requested torque calculator 51 to determine whether to operate the motor 20 intermittently.

If the motor torque identified by the motor operating point is greater than the requested torque, that is, if the motor torque identified by the motor operating point is excessive for the requested torque, the operation mode determiner 54 decides to operate the motor 20 intermittently. If the motor torque identified by the motor operating point is equal to or less than the requested torque, that is, if the motor torque identified by the motor operating point is insufficient, the operation mode determiner 54 determines that the motor 20 can not operate intermittently. In this case, the operation mode determiner 54 decides to operate the motor 20 continuously (or perform the continuous operation).

If the operation mode determiner 54 decides to operate the motor 20 intermittently, the torque determiner 55 determines the motor operating point depending on the vehicle speed (that is, the rotational speed) based on the curve connecting motor operating points of highest system efficiency set by the motor operating point setter 53. The ECU 50 determines a motor torque identified by the motor operating point as a first torque output from the motor 20 during the motor driving period.

The torque determiner 55 sets a second torque to be output from the motor 20 during the coasting period to zero. The torque determiner 55 may decide to suspend supplying power to the motor 20 during the coasting period. When supplying power to the motor 20 is suspended, the motor torque will be generated from an induced electromotive force (back electromotive force). Such a motor torque can be estimated based on the rotational speed and the like.

If the operation mode determiner 54 decides not to operate the motor 20 intermittently, that is, if the operation mode determiner 54 decides to operate the motor 20 continuously, the torque determiner 55 determines the requested torque calculated by the requested torque calculator 51 as a motor torque to be output from the motor 20.

If the operation mode determiner 54 decides to operate the motor 20 intermittently, the motor controller 56 determines a period of operating cycle having a motor driving period and a coasting period set therein. The period of operating cycle is determined based on a speed change amplitude from the start to the end of each of the motor driving period and the coasting period and torques output during each of the motor driving period and the coasting period. The speed change amplitude refers to a difference between vehicle speeds (or rotational speeds) at the start and at the end of the motor driving period (or the coasting period).

For example, the period of operating cycle is given by a sum of a speed change amplitude during the motor driving period ($\Delta V1$) divided by a vehicle acceleration ($\alpha1$) during the motor driving period and a speed change amplitude ($\Delta V2$) during the coasting period divided by a vehicle acceleration ($\alpha2$) during the coasting period. That is, the period of operating cycle (T) is calculated according to the following equation (1).

$$T = \Delta V1/\alpha1 + \Delta V2/\alpha2 \tag{1}$$

The vehicle acceleration ($\alpha1$) during the motor driving period is determined by the first torque, the vehicle speed, and vehicle performance. More specifically, the vehicle acceleration (α1) during the motor driving period is determined by map calculation based on the first torque and the vehicle speed. The vehicle acceleration (α2) during the coasting period is also determined in a similar manner by the second torque, the vehicle speed and the vehicle performance. More specifically, the vehicle acceleration (α2) during the coasting period is determined by map calculation based on the second torque and the vehicle speed.

Figure 6:
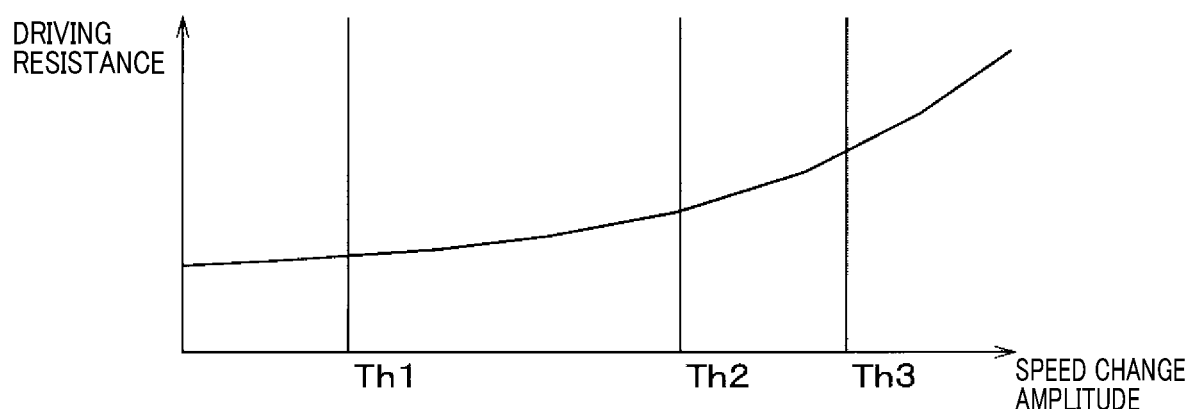
FIG. 6 is an example tolerance of speed change amplitude.

The motor controller 56 determines the speed change amplitude (ΔV1, ΔV2) within a specific range. More specifically, the motor controller 56 determines the speed change amplitude within a range of a first threshold Th1 to either a second threshold Th2 or a third threshold Th3, whichever is smaller. As shown in FIG. 6, the speed change amplitude (ΔV1, ΔV2) can not take on a value less than the first threshold Th1 due to the response performance of the motor 20. The speed change amplitude (ΔV1, ΔV2) can not take on a value equal to or greater than the second threshold Th2 because the driver can not stand such a speed change. The speed change amplitude (ΔV1, ΔV2) can not take on a value equal to or greater than the third threshold Th3 because the energy loss increases as the driving resistance increases. Therefore, preferably, the motor controller 56 determines the speed change amplitude within a predetermined range depending on the vehicle speed.

If the operation mode determiner 54 decides to operate the motor 20 intermittently, the motor controller 56 determines the motor driving period and the coasting period based on the first torque that is output during the motor driving period and the second torque that is output during the coasting period.

More specifically, the motor controller 56 determines the motor driving period and the coasting period such that an integrated value of the requested torque for one period of operating cycle is equal to a sum of an integrated value of the first torque output during the motor driving period for one period of operating cycle and an integrated value of the second torque output during the coasting period for one period of operating cycle. For example, the motor driving period and the coasting period can be determined so as to satisfy the following equations.

$$T \times Nr = T1 \times N1 + T2 \times N2 \qquad (2)$$

$$T = T1 + T2 \qquad (3)$$

In the equations (2) and (3), T represents the period of operating cycle, Nr represents the requested torque, T1 represents the motor driving period, N1 represents the first torque, T2 represents the coasting period, N2 represents the second torque. Preferably, the motor driving period and the coasting period may be determined within a predetermined range so that the driver does not feel discomfort.

Figure 7:
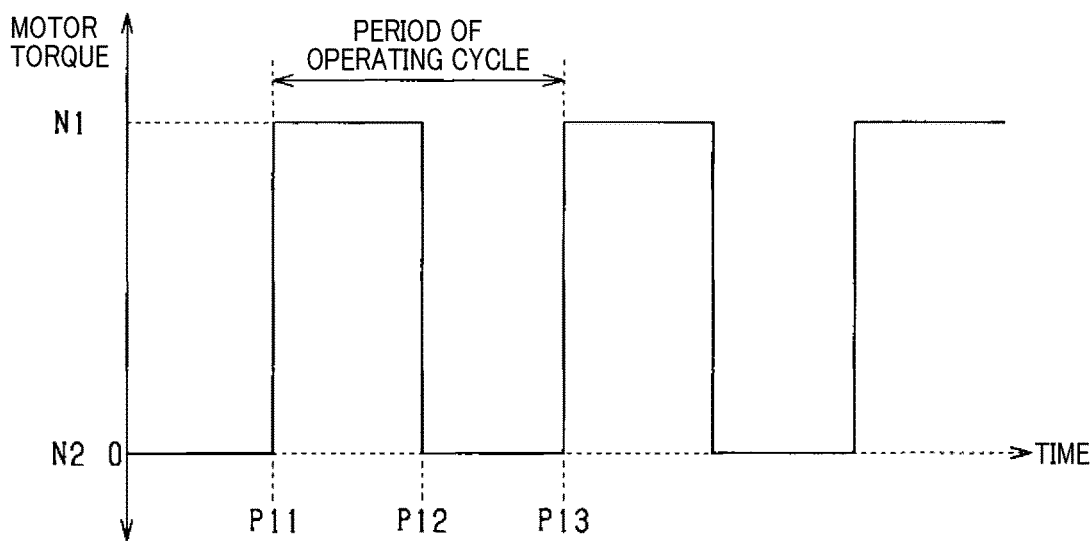
FIG. 7 is an example timing diagram of a motor driving period and a coasting period.

If the operation mode determiner 54 decides to operate the motor 20 intermittently, the motor controller 56 directs the inverter 25 to cause the motor 20 to output the first torque during the motor driving period (during a period of time P11 to time P12) as shown in FIG. 7. When the determined motor driving period has elapsed after the start of the motor driving period (time P11), the motor controller 56 starts the coasting period (time P12). The motor controller 56 then directs the inverter 25 to cause the motor 20 to output the second torque during the coasting period (during a period of time P12 to time P13).

When the determined coasting period has elapsed after the start of the coasting period (time P12), the motor controller 56 starts the motor driving period (time P13). That is, the motor controller 56 sets the motor driving period and the coasting period every determined operating cycle. The motor controller 56 repeatedly alternates between the motor driving period and the coasting period until a change in condition occurs.

If the operation mode determiner 54 decides to cause the motor 20 to operate continuously, the motor controller 56 directs the inverter 25 to cause the motor 20 to output the requested torque.

Figure 8:
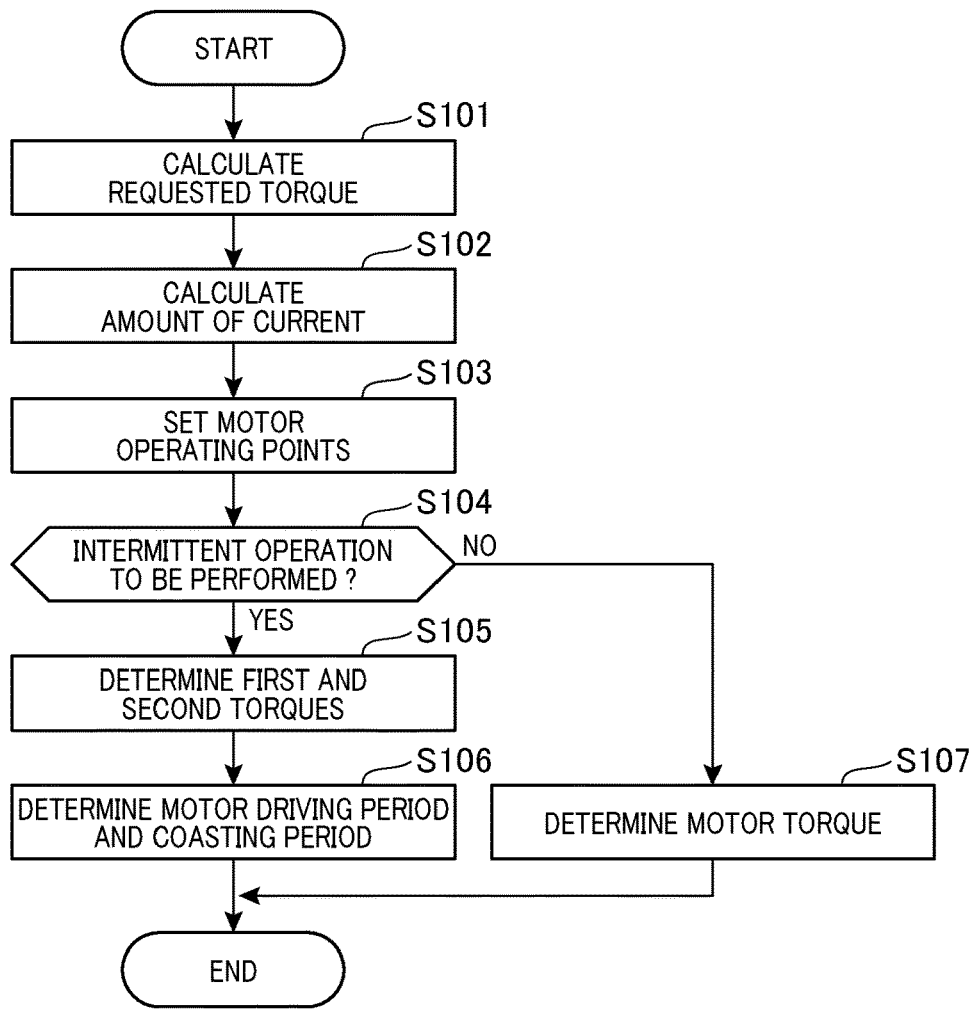
FIG. 8 is a flowchart of motor control processing.

Motor control processing for controlling the motor 20 will now be described with reference to FIG. 8. This motor control processing is performed by the ECU 50 at each of prescribed timings. For example, the motor control processing may be performed by the ECU 50 every predetermined time interval or each time external circumstances of the ECU 50 have changed, such as when driver operation information or the vehicle speed has changed. That is, the motor control processing may be performed based on external signals.

At step S101, the ECU 50 serves as the requested torque calculator 51 and calculates a requested torque of the motor 20 based on travel requirements (regarding driver operation information and the vehicle speed)

At step S102, the ECU 50 serves as the amount-of-current calculator 52 and calculates an amount of current flowing through the high-voltage battery 30. At step S102, the amount-of-current calculator 52 calculates an amount of discharge current of the high-voltage battery 30 caused by supply of power to the electrical loads 40 (the low-voltage battery 42 and the accessories 43).

At step S103, the ECU 50 serves as the motor operating point setter 53 and sets motor operating points that can specify the system efficiency, the motor torque, and the rotational speed based on the amount of current flowing through the high-voltage battery 30 calculated at step S102. At step S103, the motor operating point setter 53 of the ECU 50 sets a curve (map) connecting motor operating points of highest system efficiency, as a function of the amount of current flowing through the high-voltage battery 30.

At step S104, the ECU 50 serves as the operation mode determiner 54 and determines whether to operate the motor 20 intermittently. If the answer is yes at step S104, the operation mode determiner 54 of the ECU 50 decides to operate the motor 20 intermittently. If the answer is no at step S104, the operation mode determiner 54 of the ECU 50 decides to operate the motor 20 continuously. During continuous operation of the motor 20, the motor 20 is braked or driven continuously.

If the answer is yes at step S104, then at step S105 the ECU 50 serves as the torque determiner 55 and determines a first torque that is output during the motor driving period and a second torque that is output during the coasting period. At step S105, the ECU 50, references the curve set at step S103 connecting the motor operating points of highest system efficiency and determines a motor operating point based on the vehicle speed. The torque determiner 55 of the ECU 50 determines the motor torque identified by the motor operating point as a first torque. The torque determiner 55 of the ECU 50 determines zero as a second torque.

At step S106, the ECU 50 serves as the motor controller 56 and determines a period of operating cycle having the motor driving period and the coasting period set therein, the motor driving period, and the coasting period. At step S106, the motor controller 56 of the ECU 50 determines the period of operating cycle based on a speed change amplitude from the start to the end of each of the motor driving period and the coasting period, and a torque output during each of the motor driving period and the coasting period. The motor controller 56 of the ECU 50 determines the motor driving period and the coasting period such that an integrated value of the requested torque for one period of operating cycle is equal to a sum of an integrated value of the first torque output during the motor driving period for one period of operating cycle and an integrated value of the second torque output during the coasting period for one period of operating cycle. Thereafter, the process flow of the motor control processing ends.

If the answer is no at step S104, then at step S107 the ECU 50 determines a requested torque as a motor torque. Thereafter, the process flow of the motor control processing ends.

After the process flow of motor control processing ends, the ECU 50 controls the motor 20 based on the information determined in the motor control processing. That is, if the operation mode determiner 54 decides to operate the motor 20 intermittently, then the ECU 50 directs the inverter 25 to cause the motor 20 to output the first torque determined at step S105 during the motor driving period. After the motor driving period determined at step S106 has elapsed from the start of the motor driving period, the ECU 50 starts the coasting period. During the coasting period, the ECU 50 directs the inverter 25 to cause the motor 20 to output the second torque determined at step S106. After the coasting period determined at step S106 has elapsed from the start of the coasting period, the ECU 50 starts the motor driving period. Thereafter, the ECU 50 repeatedly executes these steps until the motor control processing is newly started.

If the operation mode determiner 54 decides to operate the motor 20 continuously, then the ECU 50 directs the inverter 25 to cause the motor 20 to output the requested torque.

The present embodiment can provide the following advantages.

The battery loss is determined based on an amount of current flowing through the high-voltage battery 30. Therefore, the ECU 50 is configured to, based on the amount of current flowing through the high-voltage battery 30, set motor operating points, each of which specifies the system efficiency representing a ratio of input/output dynamical power of the motor 20 to input/output power of the high-voltage battery 30, a motor torque of the motor 20, and a rotational speed of the motor 20 that are taken as parameters. More specifically, the ECU 50 sets a curve (map) connecting motor operating points of highest system efficiency depending on the amount of current and then controls the motor 20 based on the set curve connecting motor operating points of highest system efficiency. That is, with reference to the set curve connecting motor operating points, the ECU 50 determines a motor operating point based on the vehicle speed and then controls the motor 20 such that the motor 20 outputs the motor torque identified by the determined motor operating point. This configuration, taking into account the battery losses in the high-voltage battery 30, allows for efficient power use across the entire power system 101. That is, this configuration can reduce power consumption in the vehicle 10, thereby improving the electricity economy.

The ECU 50 is configured to, during the intermittent operation of the motor 20 where the motor driving period and the coasting period are periodically switched, control the motor 20 to operate at more efficient motor operating points during the motor driving period as compared with during the continuous operation of the motor 20. In the present embodiment, when the motor 20 is operated intermittently, the ECU 50 controls the motor 20 to operate at the motor operating points of highest efficiency during the motor driving period. This configuration enables efficiently driving the vehicle while reducing the power consumption in the motor 20. The motor operating points set by the motor operating point setter 53 are set taking into account not only the efficiency of the motor 20, but also the amount of current flowing through the high-voltage battery 30. That is, the battery losses are also taken into account. Therefore, when driving the vehicle 10, electricity economy can be improved while reducing the overall power consumption.

The ECU 50 is configured to calculate the requested torque based on the travel requirements of the vehicle 10. The ECU 50 is configured to, when operating the motor 20 intermittently, determine the motor driving period and the coasting period based on the requested torque, the first torque that is output during the motor driving period, and the second torque that is output during the coasting period. This configuration can enhance electricity economy across the vehicle 10 while properly satisfying travel requirements.

A large speed change amplitude may lead to a large driving resistance as compared with the case of a small speed change amplitude. The energy loss increases as the driving resistance increases. An increased energy loss may counteract electricity economy enhancing effect. Therefore, the ECU 50 is configured to determine a period of operating cycle having the motor driving period and the coasting period set therein based on a speed change amplitude from the start to the end of each of the motor driving period and the coasting period and a torque output during each of the motor driving period and the coasting period, which allows the speed change amplitude to fall within a desired range, that is, within a range in which the electricity economy enhancing effects are not counteracted.

In the present embodiment, the amount of current flowing through the high-voltage battery 30 is an amount of discharge current of the high-voltage battery 30 caused by supply of power to the electrical loads 40. Therefore, the motor operating points can be set taking into account battery losses based on the amount of discharge current of the high-voltage battery 30 caused by power to the electrical loads 40. This configuration can enhance electricity economy across the vehicle 10.

As shown in FIG. 4, when the amount of current flowing through the high-voltage battery 30 is large, the ECU 50 lowers the motor torques identified by the motor operating points of highest system efficiency as compared with when the amount of current flowing through the high-voltage battery 30 is small. Lowering the motor torques in this manner can decrease the amount of current to the motor 20, which can lead to a further reduction in the amount of current flowing through the high-voltage battery 30. That is, the battery losses can be reduced, thereby enhancing the efficiency across the entire power system 101.

The ECU 50 is configured to, when operating the motor 20 intermittently, control the motor 20 to operate at the motor operating points of highest system efficiency during the motor driving period, which can further increase the efficiency of the power system 101.

The ECU 50 is configured to, when operating the motor 20 intermittently, determine a speed change amplitude from the start to the end of each of the motor driving period and the coasting period from within a predefined range as shown in FIG. 6. This configuration can provide a speed change amplitude that does not cause the driver to feel discomfort. This configuration can also provide a speed change amplitude that does not decrease the electricity economy.

The ECU 50 is configured to, when operating the motor 20 intermittently, determine the motor driving period and the coasting period within a predefined range so as not to cause the driver to feel discomfort. This configuration can prevent the driver from feeling discomfort such that the driver does not experience acceleration as expected during acceleration of the vehicle or such that the driver does not experience regeneration braking as expected during deceleration.

The ECU 50 is configured to, when operating the motor 20 intermittently, sets the second torque that is output during the coasting period to zero. That is, the ECU 50 is configured to carry out field weakening so as to counteract an induced electromotive force (back electromotive force) generated in the motor 20. This configuration can prevent occurrence of a failure caused by the back electromotive force. In addition, this can prevent a reduction in efficiency caused by negative torques (or braking torques) that may occur during power-running driving. Particularly, when the vehicle speed is high, a large negative torque occurs, which leads to poorer electricity economy than the poor electricity economy caused by field weakening.

The ECU 50 is configured to calculate a sum of an amount of current responsive to requests from the accessories 43 and an amount of charge current to the low-voltage battery 42, thereby calculating the amount of discharge current of the high-voltage battery 30 caused by supply of power to the electrical loads 40. This can increase the power system efficiency taking into account the presence of both the accessories 43 and the low-voltage battery 42.

Second Embodiment

A second embodiment will now be described. Only differences of the second embodiment from the first embodiment will be described and description about the common configuration between the first and second embodiments is not provided in order to avoid repetition. Identical or equivalent components or components of equal or equivalent function are identified by the same or similar reference numerals.

The rotary shaft 21 of the motor 20 is mechanically coupled to the axles 23 via the speed reducer 22. More specifically, the speed reducer 22 includes a plurality of gears and meshes the motor side gear with each drive shaft side gear, thereby transferring forces from the motor 20 to the axles 23. Gaps (so called backlash) between gear teeth are provided in the rotational direction (that is, in a movement direction). These gaps allow the gears to smoothly rotate.

However, when the drive shaft side gear switches between a driven state by the motor side gear and a non-driven state, the teeth of the motor side gear and the teeth of the drive shaft side gear may collide due to the presence of gaps between the teeth of these gears, which may cause noise or vibration. Particularly, when the motor 20 is operated intermittently as described in the first embodiment, the motor torques are switched periodically and continuously. Thus, the teeth of the motor side gear and the teeth of the drive shaft side gear collide periodically and continuously, which may cause noise or vibration.

In a second embodiment, a configuration to mitigate impacts at torque switching times is added to the configuration of the first embodiment, this additional configuration of the second embodiment will now be described in detail.

Figure 9:
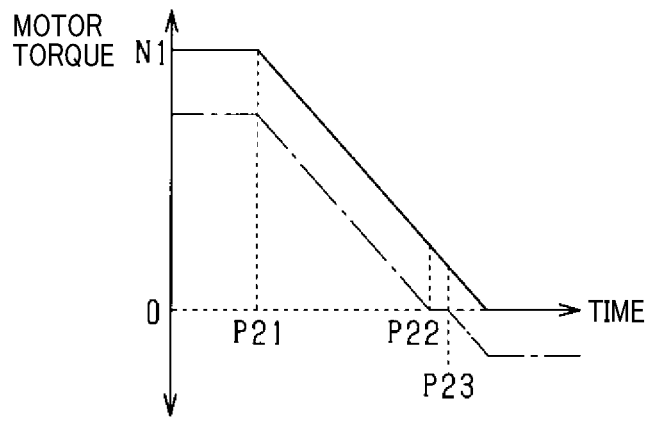
FIG. 9 is an example change over time in drive shaft torque.

The principle of the motor side gear and the drive shaft side gear colliding after moving away from each other due to the presence of backlash and a method of mitigating the collision will be described. FIG. 9 illustrates an example change in motor torque from the first torque (positive torque in the present embodiment) to the second torque (zero torque in the present embodiment) when the motor 20 is operated intermittently during acceleration of the vehicle 10. In FIG. 9, the motor torque indicated by a solid line and the drive shaft torque is indicated by a dashed-dotted line. For illustration purposes, a period of transition from the first torque to the second torque is shown enlarged.

The drive shaft torque is a torque transmitted between the motor side gear and the drive shaft side gear. The drive shaft torque when positive and the drive shaft torque when negative differ in transmission direction. The drive shaft torque can be identified by the motor torque and friction (mechanically frictional loss). When the motor side gear and the drive shaft side gear intermesh, the motor torque minus a force applied from the drive wheels 24 based on the friction (referred to as a friction torque) yields the drive shaft torque. The friction torque increases depending on the rotational speed.

A shown in FIG. 9, as the motor torque decreases from the first torque N1 after the end of the motor driving period (time P21), the drive shaft torque also decreases. When the drive shaft torque has reached zero (time P22), that is, when the motor torque becomes equal to the friction torque, the teeth of the motor side gear and the teeth of the drive shaft side gear begin to move away from each other due to the presence of backlash.

When further decreasing the motor torque, the drive shaft torque remains at zero because the motor side gear and the drive shaft side gear do not intermesh, but the motor torque becomes less than the friction torque, which results in the drive shaft side gear changing from the driven state by the motor side gear to the non-driven state. The teeth of the drive shaft side gear will approach the teeth of the motor side gear opposite from the teeth of the motor side gear that the teeth of the drive shaft side gear have so far have been in contact with in the rotational direction.

Thereafter, the drive shaft side gear will contact the opposite side teeth of the motor side gear (time P23), and the drive shaft side gear and the motor side gear will mesh in the opposite direction. The motor torque will decrease to zero. At that time, the drive shaft torque becomes negative because the motor torque is less than the friction torque. That is, based on the friction, a torque is applied from the drive shaft side gear to the motor side gear, the driven state and the non-driven state are thus switched.

As above, the driven state and the non-driven state of the drive shaft side gear are switched during a period in time where the drive shaft torque is zero, which is followed by the gear teeth collision. In view of the above, to reduce a relative speed, a motor torque corresponding to the friction torque is momentarily output during the period in time where the drive shaft torque is zero, thereby dampen shocks caused by the gear teeth collision.

In view of the above, in the second embodiment, when a motor torque corresponding to the drive shaft torque of zero is present between the first torque and the second torque, a transition period during which a third torque (that is a motor torque corresponding to the friction torque) is output is provided between the motor driving period and the coasting period.

Preferably, the transition period is set after the teeth move away from each other and immediately before the teeth intermesh. From the point of view of electricity economy, a length of the transition period is set preferably as short as possible. However, from the point of view of responsivity of the motor 20 or the like, it is difficult to momentarily output a torque immediately before the teeth intermesh. Therefore, the transition period may be provided with some allowance.

In the present embodiment, the transition period is set according to a map based on the rotational speed and the magnitude of backlash.

In addition, if the third torque is set to a motor torque corresponding to the drive shaft torque of zero, that is, the friction torque and the motor torque are set equal, transition between the driven state where the drive shaft torque is positive and the non-driven state will not occur. Therefore, the third torque may preferably be set near the motor torque corresponding to the drive shaft torque of zero taking into account the rotational direction.

For example, when the drive shaft torque switches from positive to negative, the third torque may preferably be set to a torque slightly less than the motor torque corresponding to the drive shaft torque of zero. When the drive shaft torque switches from negative to positive, the third torque may preferably be set to a torque slightly greater than the motor torque corresponding to the drive shaft torque of zero. This configuration allows for slow or moderate transition between the driven state and the non-driven state of the drive shaft side gear, thereby enabling contact with the opposite side teeth.

Figure 10:
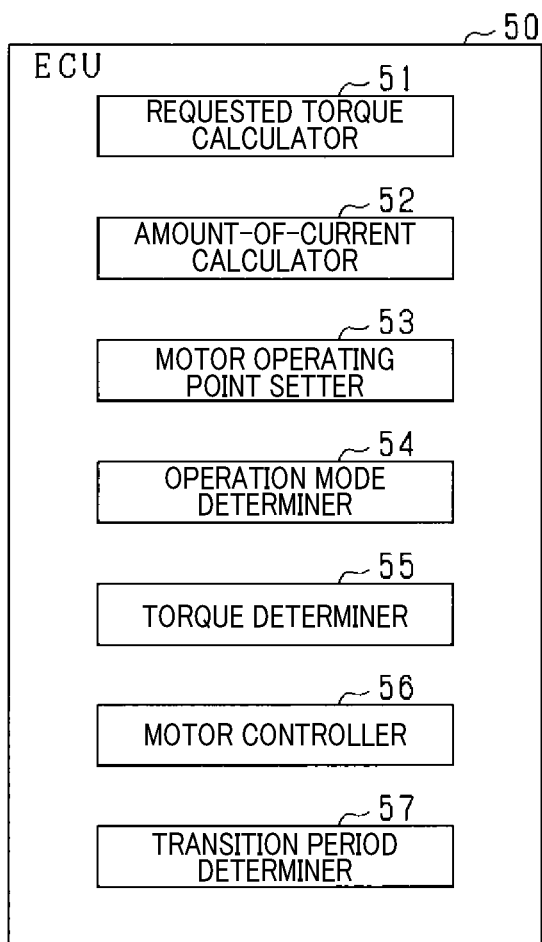
FIG. 10 is a functional block diagram of an ECU in accordance with a second embodiment.

To provide such a transition period as described above, the ECU 50 of the second embodiment includes, as functional blocks, the requested torque calculator 51, the amount-of-current calculator 52, the motor operating point setter 53, the operation mode determiner 54, a torque determiner 55, a motor controller 56, and a transition period determiner 57 as shown in FIG. 10. The requested torque calculator 51, the amount-of-current calculator 52, the motor operating point setter 53, and the operation mode determiner 54 are the same blocks as in the first embodiment and thus will not be redundantly described.

The transition period determiner 57 is configured to, if the operation mode determiner 54 decides to operate the motor 20 intermittently, whether to set a transition period during which the third torque is output between the motor driving period and the coasting period based on the first torque and the second torque. As in the first embodiment, the first torque and the second torque are determined by the torque determiner 55.

More specifically, the transition period determiner 57 determines whether or not the motor torque corresponding to the drive shaft torque of zero is present between the first torque and the second torque. If the motor torque corresponding to the drive shaft torque of zero is present between the first torque and the second torque, the transition period determiner 57 determines that the drive shaft side gear switches between the driven state by the motor side gear and the non-driven state and the teeth intermesh, and thus decides to set the transition period. If the motor torque corresponding to the drive shaft torque of zero is not present between the first torque and the second torque, the transition period determiner 57 determines that the teeth are not likely to intermesh and thus decides not to set the transition period. As the motor torque corresponding to the drive shaft torque of zero varies with the rotational speed, the transition period determiner 57 calculates the motor torque corresponding to the drive shaft torque of zero as a function of the rotational speed based on the map.

The torque determiner 55 of the second embodiment is configured to, if the transition period determiner 57 decides to set the transition period, determine the third torque that is output by the motor 20 during the transition period. More specifically, the torque determiner 55 calculates the motor torque corresponding to the drive shaft torque of zero as a function of the rotational speed based on the map.

When the drive shaft torque switches from negative to positive, the ECU 50 determines a torque slightly greater than the motor torque corresponding to the drive shaft torque of zero as a third torque. When the drive shaft torque switches from positive to negative, the ECU 50 determines a torque slightly less than the motor torque corresponding to the drive shaft torque of zero as a third torque. A difference by which the motor torque corresponding to the drive shaft torque of zero is increased or decreased to the third torque may preferably be determined based on the magnitude of backlash.

The motor controller 56 of the second embodiment is configured to, if the transition period determiner 57 decides to set a transition period, determine a length of the transition period. More specifically, the motor controller 56 determines a length of the transition period using a map based on the rotational speed and the magnitude of backlash.

Subsequently, the motor controller 56 determines a period of operating cycle. The period of operating cycle is determined based on the length of the transition period, a speed change amplitude from the start to the end of each of the motor driving period and the coasting period, a torque output during each of the motor driving period and the coasting period.

For example, the period of operating cycle is given by a sum of the speed change amplitude during the motor driving period ($\Delta V1$) divided by a vehicle acceleration ($\alpha 1$) during the motor driving period and a speed change amplitude ($\Delta V2$) during the coasting period divided by a vehicle acceleration ($\alpha 2$) during the coasting period, and the length of the transition period (T3). That is, the period of operating cycle (T) is calculated according to the following equation (4). The transition period is provided twice within one period of operating cycle, that is, between the motor driving period and the coasting period and between the coasting period and the motor driving period. In the equation (4), the transition period is doubled.

$$T = \Delta V1/\alpha 1 + \Delta V2/\alpha 2 + T3 \times 2 \qquad (4)$$

The motor controller 56 is configured to determine the motor driving period and the coasting period based on the requested torque, the first torque, the second torque, and the third torque. More specifically, the motor controller 56 determines the motor driving period and the coasting period such that an integrated value of the requested torque for one period of operating cycle is equal to a sum of an integrated value of the first torque output during the motor driving period for one period of operating cycle and an integrated value of the second torque output during the coasting period for one period of operating cycle, and an integrated value of the third torque output during the transition period for one period of operating cycle.

For example, the motor driving period and the coasting period are determined to satisfy the equations (5) and (6).

$$T \times Nr = T1 \times N1 + T2 \times N2 + T3 \times N3a + T3 \times N3b \qquad (5)$$

$$T = T1 + T2 + T3 \times 2 \qquad (6)$$

In the equations (5) and (6), T represents the period of operating cycle, Nr represents the requested torque, T1 represents the motor driving period, N1 represents the first torque, T2 represents the coasting period, N2 represents the second torque, T3 represents the transition period, N3a represents the third torque when transitioning from the motor driving period to the coasting period, and N3b represents the third torque when transitioning from the coasting period to the motor driving period.

The transition period is provided twice within one period of operating cycle, that is, between the motor driving period and the coasting period and between the coasting period and the motor driving period. Therefore, in the equations (5) and (6), the transition period is multiplied by two. If the transition period during which the third torque is output is significantly small as compared with the motor driving period and the coasting period, the transition period may be ignored and set to zero as in the first embodiment.

Figure 11:
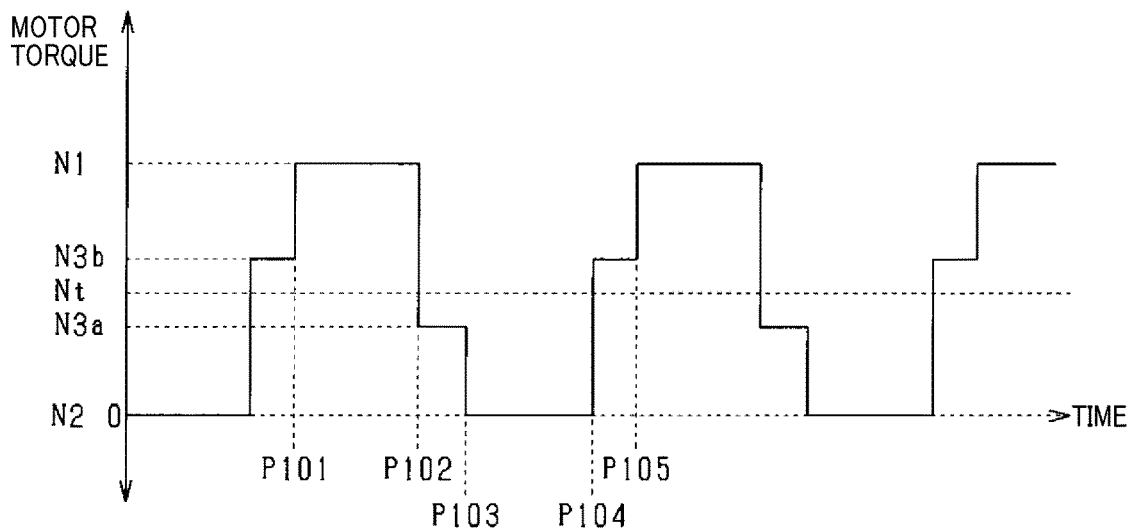
FIG. 11 is an example timing diagram of a transition period.

When operating the motor 20 intermittently and setting the transition period as shown in FIG. 11, the motor controller 56 directs the inverter 25 to cause the motor 20 to output the first torque N1 during the motor driving period (times P101 to P102). When the determined motor driving period has elapsed (time P102) after the start of the motor driving period (time P101), the motor controller 56 starts the transition period (time P102). The motor controller 56 directs the inverter 25 to cause the motor 20 to output a third torque N3a during the transition period (times P102 to P103).

The third torque N3a output during the transition period (times P102 to P103) is slightly less than a motor torque Nt corresponding to the drive shaft torque of zero. In FIG. 11, the motor torque Nt corresponding to the drive shaft torque of zero is indicated by a broken line.

When the determined transition period has elapsed (time P103) after the start of the transition period (time P102), the motor controller 56 starts the coasting period. The motor controller 56 then directs the inverter 25 to cause the motor 20 to output the second torque during the coasting period (times P103 to P104). When the determined coasting period has elapsed (time P104) after the start of the coasting period (time P103), the motor controller 56 starts the transition period. The motor controller 56 then directs the inverter 25 to cause the motor 20 to output a third torque N3b during the transition period (times P104 to P105).

The third torque N3b output during the transition period (times P104 to P105) is slightly greater than the motor torque Nt corresponding to the drive shaft torque of zero.

When the determined transition period has elapsed after the start of the transition period (time P104), the motor controller 56 starts the motor driving period (time P105). Thereafter, until a change in condition occurs, the motor controller 56 alternates between the motor driving period and the coasting period.

Figure 12:
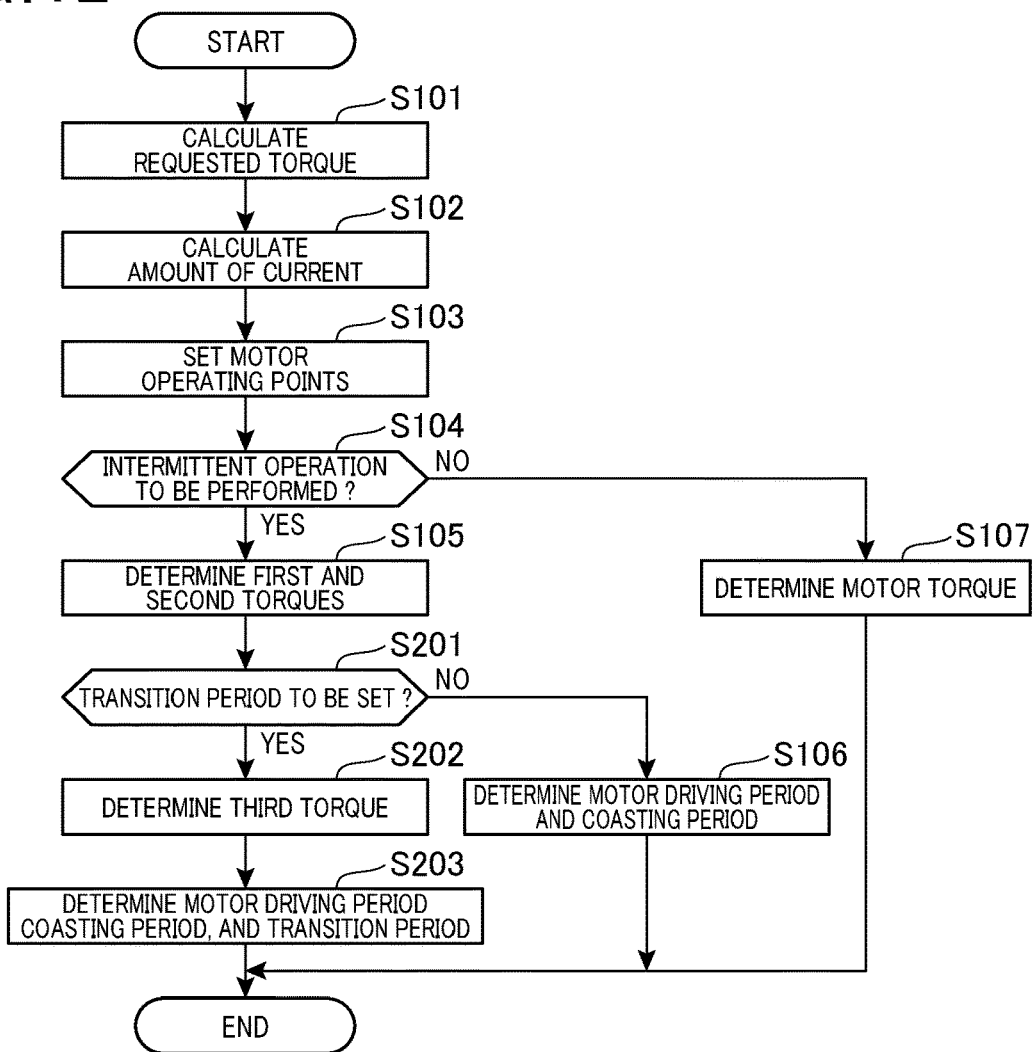
FIG. 12 is a flowchart of motor control processing.

Motor control processing of the second embodiment will now be described with reference to FIG. 12. Steps S101 to S105 of the second embodiment are the same steps as in the first embodiment and thus will not be redundantly described.

At step S201 subsequent to step S105, the ECU 50 serves as the transition period determiner 57, and based on the first torque and the second torque determined at step S105, determines whether to set a transition period.

If the answer is yes at step S201, then at step S202 the ECU 50 serves as the torque determiner 55 and determines a third torque. More specifically, the ECU 50 calculates a motor torque corresponding to the drive shaft torque of zero as a function of the rotational speed based on the map. When the drive shaft torque switches from negative to positive, the ECU 50 determines a torque slightly greater than the motor torque corresponding to the drive shaft torque of zero as a third torque. When the drive shaft torque switches from positive to negative, the ECU 50 determines a torque slightly less than the motor torque corresponding to the drive shaft torque of zero as a third torque.

At step S203, the ECU 50 serves as the motor controller 56 and determines the motor driving period, the coasting period, a length of the transition period, and the period of operating cycle. At step S203, based on the rotational speed and the magnitude of backlash, the ECU 50 determines the length of the transition period using the map. The ECU 50 determines the period of operating cycle based on the equation (4). The ECU 50, based on the requested torque, the first torque, the second torque, and the third torque, determines the motor driving period and the coasting period so as to satisfy the equations (5) and (6). Thereafter, the process flow of the motor control processing ends.

If the answer is no at step S201, then at step S106 the ECU 50 performs a similar process as in the first embodiment. Thereafter, the process flow of the motor control processing ends. If the answer is no at step S104, then at step S107 the ECU 50 determines the requested torque as a motor torque. Thereafter, the process flow of the motor control processing ends.

After the process flow of motor control processing ends, the ECU 50 controls the motor 20 based on information determined in the motor control processing. That is, if the operation mode determiner 54 decides to operate the motor 20 intermittently and set the transition period, then the ECU 50 sets the transition period in which the third torque is output after setting the motor driving period in which the first torque is output. After the transition period has elapsed, the ECU 50 sets the coasting period in which the second torque is output. After the coasting period has elapsed, the ECU 50 again sets the transition period.

The second embodiment set forth above can provide the following advantages.

If a determination to provide the transition period is made based on the first torque and the second torque, the transition period during which the third torque is output is provided between the motor driving period and the coasting period. The third torque is determined within a specific range between the first torque and the second torque, which range includes the motor torque corresponding to the drive shaft torque of zero. That is, the third torque that is near the motor torque corresponding to the drive shaft torque of zero is output between the motor driving period and the coasting period. Therefore, even if there is backlash between the teeth of the motor side gear and the teeth of the drive shaft side gear, providing the third torque output during the transition period can prevent the teeth of the motor side gear and the teeth of the drive shaft side gear from abruptly colliding with each other.

During the transition period, when changing the motor torque such that the drive shaft torque changes from negative to positive, the ECU 50 sets the third torque to be greater than the motor torque corresponding to the drive shaft torque of zero. During the transition period, when changing the motor torque such that the drive shaft torque changes from positive to negative, the ECU 50 sets the third torque to be less than the motor torque corresponding to the drive shaft torque of zero. With this configuration, the third torques are provided immediately before a collision of the teeth occurs to mitigate the collision.

The ECU 50 determines the third torque based on the rotational speed of the motor 20. That is, the ECU 50 calculates a motor torque corresponding to the drive shaft torque of zero as a function of the rotational speed based on the map, and based on the determined motor torque and a rotational direction of this motor torque, determines the third torque. With this configuration, even if the friction torque applied to the axles 23 via the drive wheels 24 varies with change in the rotational speed of the motor 20 and the motor torque corresponding to the drive shaft torque of zero varies accordingly, the third torque can be determined properly.

If there is not any motor torque corresponding to the drive shaft torque of zero between the first torque and the second torque, that is, if the motor torque does not change through the motor torque corresponding to the drive shaft torque of zero as the motor torque switches between the first torque and the second torque, the drive shaft side gear will not switch between the driven state and the non-driven state. If the drive shaft side gear does not switch between the driven state and the non-driven state, a collision caused by backlash does not occur. If there is not any motor torque corresponding to the drive shaft torque of zero between the first torque and the second torque, the ECU 50 decides not to set any transition period, thereby providing no third torque. This configuration can reduce power consumption of the motor 20.

Figure 13:
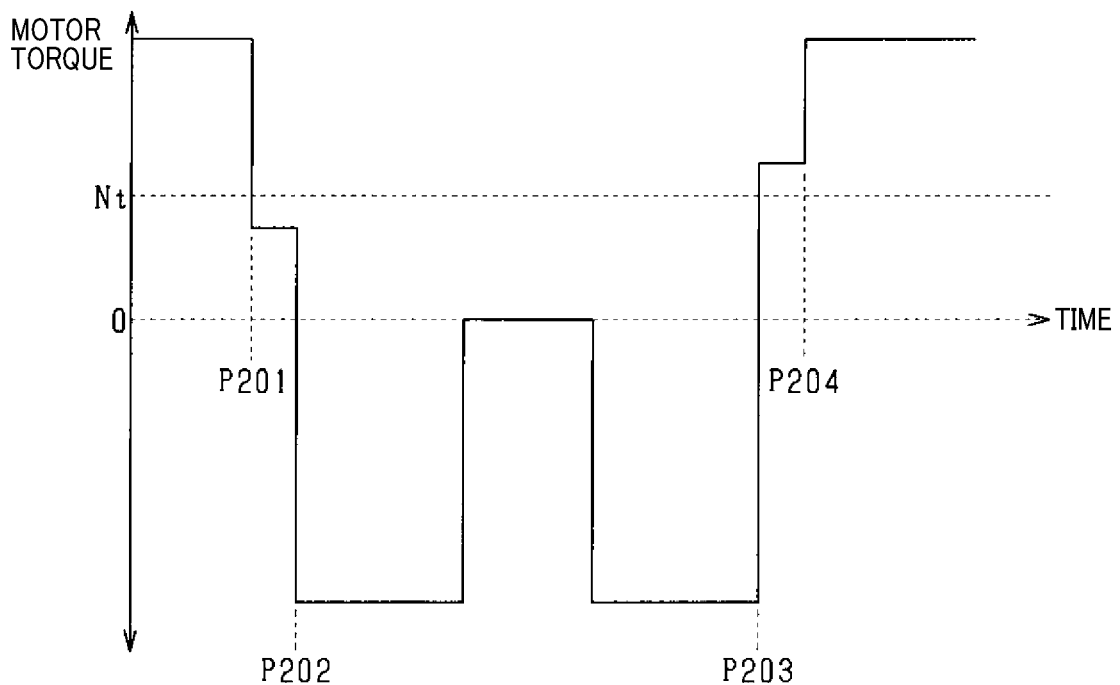
FIG. 13 is an example change over time in motor torque during electrical power regeneration.

An example of a case where the motor torque does not change through the motor torque corresponding to the drive shaft torque of zero as the motor torque switches between the first torque and the second torque is when electrical power regeneration is performed. That is, as shown in FIG. 13, the first torque during the motor driving period is negative, and the second torque during the coasting period is also near and equal to or less than zero. The motor torque Nt corresponding to the drive shaft torque of zero is necessarily positive due to the presence of friction. Thus, when electrical power regeneration is performed, the drive shaft side gear does not switch between the driven state and the non-driven state. Thus, there is no need to provide a transition period.

If the motor torque is switched across the motor torque corresponding to the drive shaft torque of zero when switching from power-running driving to electrical power regeneration, a transition period may be set when switching from power-running driving to electrical power regeneration as shown in FIG. 13 (times P201 to P202). Likewise, a transition period may also be set when switching from electrical power regeneration to power-running driving as shown in FIG. 13 (times P203 to P204).

Third Embodiment

A third embodiment will now be described. Only differences of the third embodiment from the first or second embodiment will be described. Identical or equivalent components are identified by the same or similar reference numerals and description about the common configuration is not provided in order to avoid repetition. For illustration purposes, in the third embodiment, it is assumed that an amount of current between the high-voltage battery 30 and the motor 20 is constant. For example, the motor 20 is operated continuously.

In the third embodiment, a voltage conversion method performed by the converter 41 will now be described. Generally, losses occur when the converter 41 steps down voltage output from the high-voltage battery 30, that is, when voltage conversion is performed.

Figure 14:
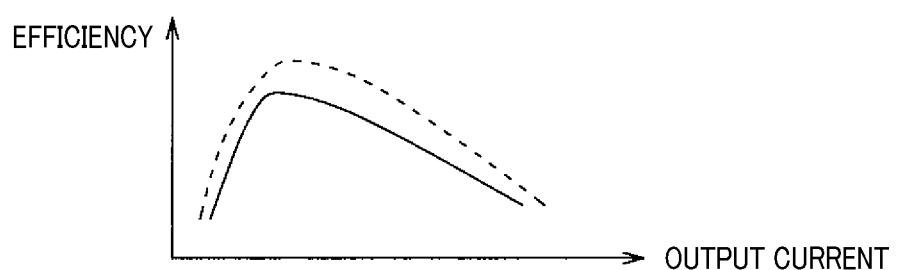
FIG. 14 is an example converter efficiency map.

The voltage conversion efficiency of the converter 41 is a ratio (in %) of output power to input power (voltage× current) supplied to the converter 41. For example, as indicated by a broken line in FIG. 14, the voltage conversion efficiency of the converter 41 is represented by a curve (map) taking an output current from the converter 41 as a parameter, the map as shown in FIG. 14 can be acquired by experiment or simulation.

Conventionally, when performing the voltage conversion, the converter 41 is controlled for output current of highest efficiency with reference to the curve representing the voltage conversion efficiency of the converter 41. However, the curve as shown in FIG. 14 does not take into account battery losses in the high-voltage battery 30. The battery loss in the high-voltage battery 30 is calculated by multiplying a square of an amount of current flowing through the high-voltage battery 30 (that is, an amount of current during charge/discharge of the high-voltage battery 30) by the battery resistance of the high-voltage battery 30.

Considering the power supply system 201 as a whole, it is desirable to efficiently perform the voltage conversion taking into account not only the efficiency of the converter 41, but also battery losses in the high-voltage battery 30. When current is passing between the high-voltage battery 30 and the electrical loads 40, it is desirable to control the converter 41 taking into account the voltage conversion efficiency indicating a ratio of input power to the electrical loads 40 to output power of the high-voltage battery 30. The voltage conversion efficiency refers to the efficiency of the whole power supply system 201 including the high-voltage battery 30 and the converter 41, but not including the motor 20 and the electrical loads 40.

In view of the above, in the third embodiment, a map of converter operating points (or a power conversion efficiency map) that can identify the power conversion efficiency taking the output current of the converter 41 as a parameter is created and stored in the memory of the ECU 50.

When no current is passing between the high-voltage battery 30 and the motor 20, an amount of current flowing through the high-voltage battery 30 corresponds to the output current of the converter 41 and therefore uniquely identified by the output current of the converter 41. In the power supply system 201, the power conversion efficiency map can be determined uniquely. This map can be acquired by experiment or simulation.

In FIG. 14, the power conversion efficiency map is indicated by a solid line. In FIG. 14, the power conversion efficiency map is represented by a converter operating point curve that identifies the power conversion efficiency taking the output current of the converter 41 as a parameter.

To efficiently perform the voltage conversion of the converter 41, the ECU 50 determines a converter operating point of highest efficiency with reference to the power conversion efficiency map and controls the converter 41 to output the output current identified by this converter operating point. To this end, it is desirable that the output power (output current×output voltage) from the converter 41 is equal to the requested power of the electrical loads 40. However, when performing the voltage conversion at the converter operating point of highest efficiency, the output power (output current×output voltage) from the converter 41 may be excessive for the requested power of the electrical loads 40.

In view of the above, the ECU 50 is configured to periodically alternate between a conversion period during which a voltage is converted by the converter 41 and a conversion suspension period during which voltage conversion by the converter 41 is suspended, thereby performing intermittent voltage conversion. The ECU 50 is configured such that the output power from the converter 41 during one period of conversion cycle including the conversion period and the conversion suspension period is set equal to the requested power of the electrical loads 40 during one period of conversion cycle.

When performing the voltage conversion at the converter operating point of highest efficiency, the output power of the converter 41 may be equal to or below the requested power. In such a case, regardless of the power conversion efficiency (even if the power conversion efficiency decreases), the ECU 50 controls the converter 41 by putting a priority on requests from the electrical loads 40 and outputting an output power corresponding to the requested power, where the voltage conversion is continuously performed without being suspended.

In the present embodiment, the high-voltage battery 30 is electrically connected not only to the electrical loads 40, but also to the motor 20. Regardless of the presence of the electrical loads 40, electrical power is output or input between the high-voltage battery 30 and the motor 20. Battery losses may vary with variations in the amount of current (charging/discharging amount) of the high-voltage battery 30 input to or output from the motor 20, which may affect the power supply system 201 including the converter 41 and the high-voltage battery 30. Thus, the power conversion efficiency may vary accordingly.

In the present embodiment, converter operating points, each of which can be identified by the power conversion efficiency and the output current from the converter 41 that are taken as parameters, are set based on amounts of current between the high-voltage battery 30 and the motor 20. More specifically, for each charging/discharging amount of the high-voltage battery 30 supplied from/to the motor 20, the converter operating point map that can specify the power conversion efficiency and the output current from the converter 41 is stored in the memory of the ECU 50.

The ECU 50 reads a converter operating point map in response to the charging/discharging amount of the high-voltage battery 30 from/to the motor 20. The ECU 50 determines the converter operating point of highest efficiency based on this map to determine the output current from the converter 41.

Figure 15:
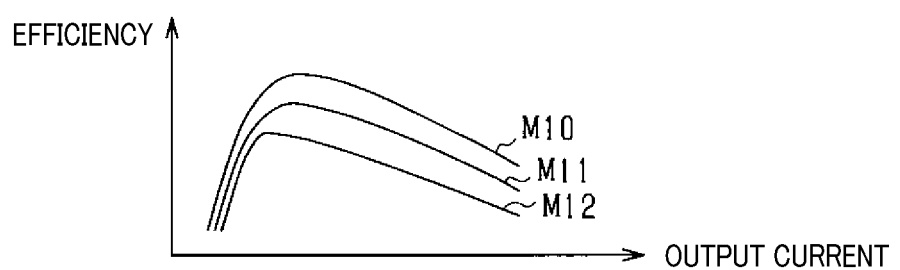
FIG. 15 is an example power conversion efficiency map.

FIG. 15 illustrates an example converter operating point map for each charging/discharging amount of the high-voltage battery 30 supplied from/to the motor 20. In FIG. 15, the map M10 is a curve when the charging/discharging amount of the high-voltage battery 30 supplied from/to the motor 20 is zero. The curve M11 is a curve when the charging/discharging amount of the high-voltage battery 30 supplied from/to the motor 20 is A11 (>0). The curve M12 is a curve when the charging/discharging amount of the high-voltage battery 30 supplied from/to the motor 20 is A12 (>A11).

Figure 16:
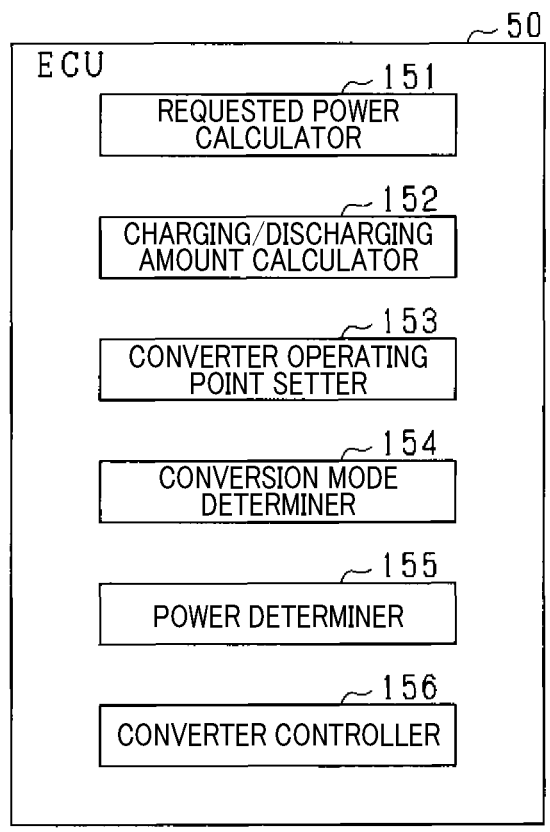
FIG. 16 is a functional block diagram of an ECU in accordance with a third embodiment.

The ECU 50 of the third embodiment has various functions described below to effectively perform voltage conversion in the manner set forth above. That is, as shown in FIG. 16, in addition to the functional blocks described regarding the first and second embodiments, the ECU 50 includes, as functional blocks relating to the voltage conversion, a requested power calculator 151, a charging/discharging amount calculator 152, a converter operating point setter 153, a conversion mode determiner 154 corresponding to a requested power determiner, a power determiner 155, and a converter controller 156 corresponding to a converter controller. Functions of these functional blocks are implemented by at least one computer formed of a central processing unit (CPU), a random access memory (RAM), a read-only member (ROM), an input/output (I/O) interface and other components, executing computer programs stored in the ROM or the like. These functional blocks may be implemented by an electronic circuit which is hardware, or may at least partially be implemented by software to be executed on the computer.

The requested power calculator 151 is configured to, based on states of the electrical loads 40, calculate requested power to be supplied from the converter 41. More specifically, the requested power calculator 151 calculates a sum of power based on requests from the accessories 43 and power needed to charge the low-voltage battery 42, thereby calculating the requested power to be supplied from the converter 41.

The power based on requests from the accessories 43 can be estimated by map calculation based on drive states of the accessories 43. The power needed to charge the low-voltage battery 42 can be estimated by map calculation based on a state of charge (SOC) of the low-voltage battery 42. The power needed to charge the low-voltage battery 42 may be estimated based on an amount of current flowing through the low-voltage battery 42 detected by a current sensor. That is, the requested power calculator 151 calculates the requested power to be supplied from the converter 41 based on the drive states of the accessories 43 and the state of charge of (or an amount of current flowing through) the low-voltage battery 42.

The charging/discharging amount calculator 152 is configured to calculate a charging/discharging amount of the high-voltage battery 30. More specifically, the charging/discharging amount calculator 152 is configured to, based on a state of the motor 20, calculate a charging/discharging amount of the high-voltage battery 30 supplied from/to the motor 20. For example, the charging/discharging amount calculator 152 may be configured to, based on a rotational speed and a motor torque of the motor 20, calculate a charging/discharging amount of the high-voltage battery 30 supplied from/to the motor 20 by map calculation.

In the present embodiment, the motor 20 corresponds to a second electrical load to which the same voltage as the output voltage of the high-voltage battery 30 is input. The accessories 43 and the low-voltage battery 42 correspond to first electrical loads to which different voltages from the output voltage of the high-voltage battery 30 are input.

The converter operating point setter 153 is configured to, based on the charging/discharging amount of the high-voltage battery 30 calculated by the charging/discharging amount calculator 152, set a converter operating point that can be identified by the power conversion efficiency and the output current. In the present embodiment, the converter operating point map that can specify the power conversion efficiency based on the output current is read or set in response to the amount of current.

The conversion mode determiner 154 is configured to, during the conversion period, determine whether to set the periodic conversion suspension period and thereby perform intermittent voltage conversion. More specifically, the conversion mode determiner 154 is configured to determine a converter operating point of highest power conversion efficiency with reference to the converter operating point map set by the converter operating point setter 153. The conversion mode determiner 154 compares the output power calculated based on the output current identified by the converter operating point and the requested power calculated by the requested power calculator 151 to determine whether to perform intermittent voltage conversion.

That is, if the output power is greater than the requested power (there is an excess of output power), the operation mode determiner 54 decides to perform intermittent voltage conversion. If the output power is less than the requested power (the output power is insufficient), the operation mode determiner 54 decides not to perform intermittent voltage conversion. In this case, the operation mode determiner 54 decides to perform voltage conversion continuously.

The conversion mode determiner 154 corresponds to a requested power determiner configured to determine whether or not the requested power is greater than a predetermined value. The predetermined value is an amount of power output when voltage conversion is performed by converter 41 at the converter operating points of highest power conversion efficiency among the converter operating points set by the converter operating point setter 153 while energization of the motor 20 is being suspended.

The power determiner 155 is configured to, if the conversion mode determiner 154 decides to perform the intermittent voltage conversion, determine the converter operating point of highest power conversion efficiency with reference to the converter operating point map set by the converter operating point setter 153. The ECU 50 determines the output current identified by the determined converter operating point as a first output current to be output by the converter 41 during the conversion period. The power determiner 155 is configured to, during the conversion suspension period, decide to suspend the voltage conversion. That is, the power determiner 155 determines zero as a second output current to be output during the conversion suspension period.

The power determiner 155 is configured to, if the conversion mode determiner 154 decides not to perform the intermittent voltage conversion, that is, if the conversion mode determiner 154 decides to perform the continuous voltage conversion, calculate an output current of the converter 41 based on the requested power calculated by the requested power calculator 151 and cause the converter 41 to output the calculated output current. The output current of the converter 41 can be calculated by dividing the requested power by an output voltage of the converter 41.

The converter controller 156 is configured to, if the conversion mode determiner 154 decides to perform the intermittent voltage conversion, determine a period of conversion cycle. During the conversion suspension period, power is supplied from the low-voltage battery 42 to the accessories 43. Therefore, it is desirable to determine the period of conversion cycle taking into account a state of charge (SOC) of the low-voltage battery 42. The period of conversion cycle is a period of cycle in which the conversion period and the conversion suspension period are set.

The converter controller 156 is configured to, if the conversion mode determiner 154 decides to perform the continuous voltage conversion, determine the conversion period and the conversion suspension period based on the requested power and the output power of the converter 41 during the conversion period.

More specifically, the converter controller 156 determines the conversion period and the conversion suspension period such that an integrated value of the requested torque for one period of conversion cycle is equal to an integrated value of the output power of the converter 41 for the conversion period.

$$X \times Wr = X1 \times W1 \quad (7)$$

$$X = X1 + X2 \quad (8)$$

In the equations (7) and (8), X represents the period of conversion cycle, Wr represents the requested power, X1 represents the conversion period, W1 represents the output power, and X2 represents the conversion suspension period.

Figure 17:
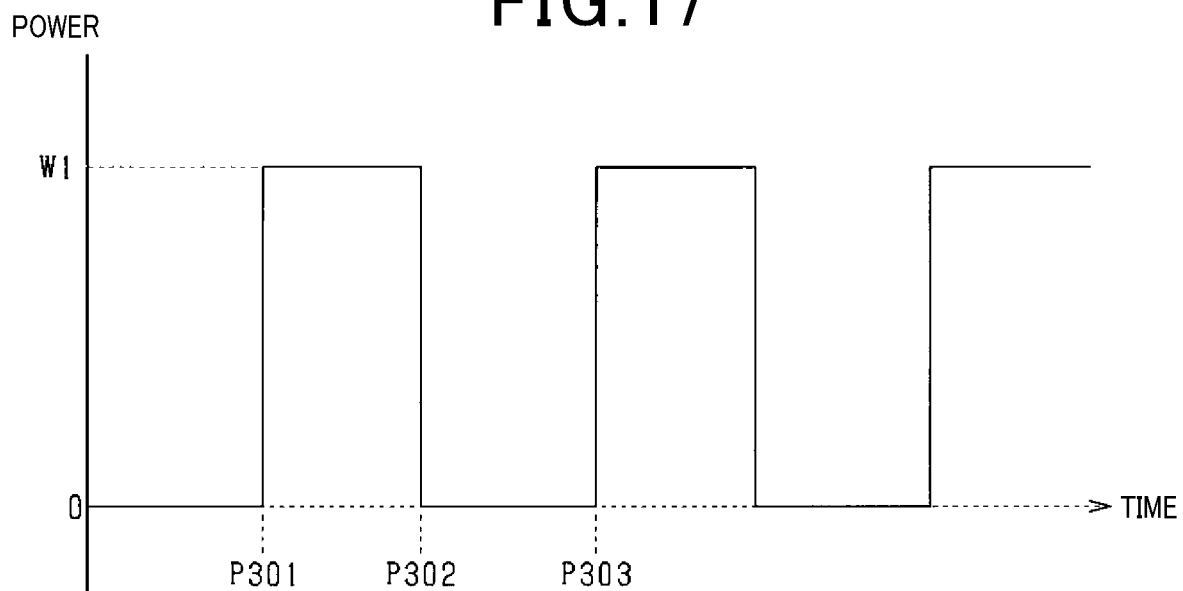
FIG. 17 is an example timing diagram of a conversion period and a conversion suspension period.

When the intermittent voltage conversion is performed, the converter controller 156 directs the converter 41 to output the output current identified by the converter operating point of highest efficiency during the conversion period (times P301 to P302) as shown in FIG. 17. When the determined conversion period has elapsed (time P302) after the start of the conversion period (time P301), the converter controller 156 starts the conversion suspension period. During the conversion suspension period (times P302 to P303), the converter controller 156 directs the converter 41 to suspend the voltage conversion. When the determined conversion suspension period has elapsed (time P303) after the start of the conversion suspension period (time P302), the converter controller 156 starts the conversion period again. That is, the converter controller 156 sets the conversion suspension period and the conversion period every conversion cycle. Until a change in condition occurs, the converter controller 156 alternates between the conversion suspension period and the conversion period.

When the continuous voltage conversion is performed, the converter controller 156 directs the converter 41 to output an output current responsive to the requested power.

Figure 18:
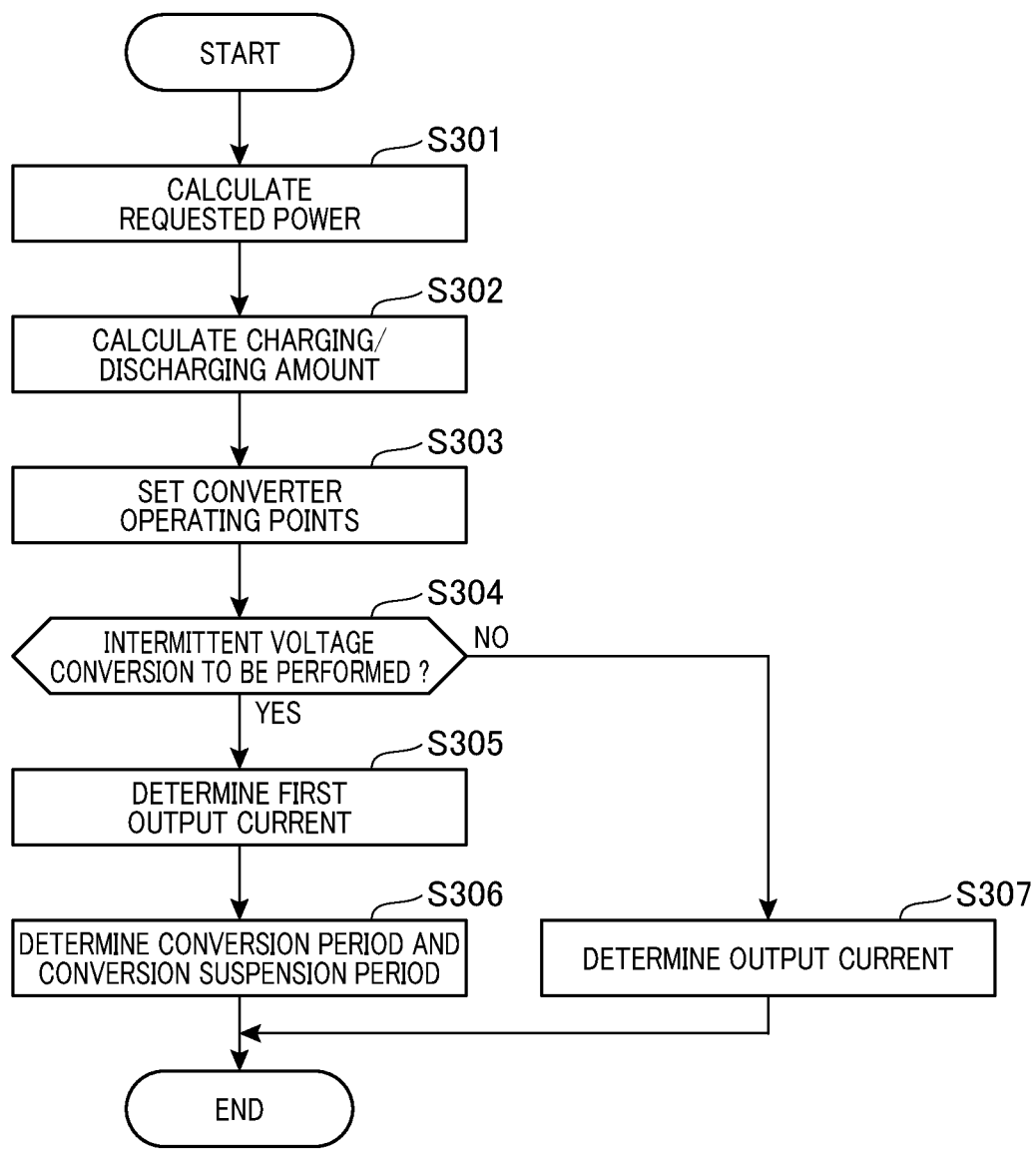
FIG. 18 is a flowchart of converter control processing.

Converter control processing for controlling the converter 41 will now be described with reference to FIG. 18. This converter control processing is performed by the ECU 50 at each of prescribed timings. For example, the converter control processing may be performed by the ECU 50 every predetermined time interval or each time external circumstances of the ECU 50 have changed, such as when drive states of the accessories 43 have changed. That is, the converter control processing may be performed based on external signals.

At step S301, the ECU 50 serves as the requested power calculator 151 and calculates requested power to be supplied from the converter 41 based on states of the electrical loads 40.

At step S302, the ECU 50 serves as the charging/discharging amount calculator 152 and calculates a charging/discharging amount of the high-voltage battery 30. At step S302, based on a state of the motor 20, the ECU 50 calculates a charging/discharging amount of the high-voltage battery 30 supplied from/to the motor 20.

At step S303, the ECU 50 serves as the converter operating point setter 153, and based on the charging/discharging amount of the high-voltage battery 30 calculated at step S302, sets a map of converter operating points that can be identified by the power conversion efficiency and the output current from the converter 41.

At step S304, the ECU 50 serves as the conversion mode determiner 154 and determines whether to perform the intermittent voltage conversion. If the answer is yes, the ECU 50 decides to perform the intermittent voltage conversion. If the answer is no, the ECU 50 decides to perform the continuous voltage conversion.

At step S305, the ECU 50 serves as the power determiner 155 and determines a first output current to be output by the converter 41 during the conversion period. At step S305, the ECU 50 determines the converter operating point of highest power conversion efficiency based on the converter operating point map set at step S303. The ECU 50 determines the output current identified by the determined converter operating point as the first output current to be output by the converter 41 during the conversion period. During the conversion suspension period, the power determiner 155 decides to suspend the voltage conversion. That is, the power determiner determines zero as a second output current to be output during the conversion suspension period.

At step S306, the ECU 50 serves as the converter controller 156 and determines the period of conversion cycle, the conversion period, and the conversion suspension period. Thereafter, the process flow of the converter control processing ends.

If the answer is no at step S304, then at step S307 the ECU 50 determines an output current from the converter 41 based on the requested power. An output voltage of the converter 41 (that is, a voltage requested by the low-voltage battery 42 and the accessories 43) is predetermined. Therefore, at step S307, the ECU 50 calculates the output current from the converter 41 by dividing the requested power by the output voltage of the converter 41. Thereafter, the process flow of the converter control processing ends.

After the process flow of converter control processing ends, based on the information determined in the converter control processing, the ECU 50 performs the voltage conversion via the converter 41. That is, if the ECU 50 decides to perform the intermittent voltage conversion, the ECU 50 directs the converter 41 to output the first output current determined at step S305 during the conversion period. The ECU 50 starts the conversion suspension period when the conversion period determined at step S306 has elapsed after the start of the conversion period. The ECU 50 directs the converter 41 to suspend the voltage conversion during the conversion suspension period. The ECU 50 starts the conversion period again when the conversion suspension period determined at step S306 has elapsed after the start of the conversion suspension period. Thereafter, the ECU 50 repeatedly executes these steps until the converter control processing is newly started.

If the ECU 50 decides to perform the continuous voltage conversion, the ECU 50 directs the converter 41 to output the output current determined at step S307 until the converter control processing is newly started.

The third embodiment set forth above can provide the following advantages.

The battery loss in the high-voltage battery 30 is determined based on the charging/discharging amount of the high-voltage battery 30 supplied from/to the motor 20. Therefore, the converter operating point by which the power conversion efficiency and the output current from the converter 41 are identified are set based on the charging/discharging amount of the high-voltage battery 30. The ECU 50 controls the converter 41 to operate at the converter operating point set based on the charging/discharging amount of the high-voltage battery 30 and thereby efficiently performs the voltage conversion across the power supply system 201 taking into account battery losses in the high-voltage battery 30, thereby supplying power to the electrical loads 40. That is, considering the vehicle 10 as a whole, the power consumption can be reduced.

When the intermittent voltage conversion is performed by periodically alternating between the conversion period and the conversion suspension period, the voltage conversion is efficiently performed at the converter operating point of high power conversion efficiency during the conversion period as compared with when the continuous voltage conversion is performed. More specifically, the converter 41 is controlled to operate at the converter operating point of highest efficiency. Therefore, efficient voltage conversion can be performed while preventing the increase of losses in the converter 41 and the high-voltage battery 30. The output power responsive to the requested power can be output from the converter 41.

The low-voltage battery 42 is provided. Therefore, even when the voltage conversion by the converter 41 is suspended, power can be supplied from the low-voltage battery 42 to the accessories 43, thereby preventing interruption of power output to the accessories 43. The conversion period and the conversion suspension period are determined based on the requested power calculated based on drive states of the accessories 43 and the output power from the converter 41. With this configuration, the intermittent voltage conversion can be performed while supplying power requested by the accessories 43, thereby enhancing the efficiency.

A high state of charge (SOC) of low-voltage battery 42 leads to a reduced amount of current to the low-voltage battery 42 during charge of the low-voltage battery 42 as compared with a low state of charge of low-voltage battery 42. That is, an amount of current to the low-voltage battery 42 is reduced, which leads to reduced battery losses in the low-voltage battery 42. Conversely, a low state of charge of low-voltage battery 42 leads to an increased amount of current to the low-voltage battery 42 during charge of the low-voltage battery 42 as compared with a high state of charge of low-voltage battery 42. Thus, the ECU 50 calculates requested power based on the state of charge of the low-voltage battery 42 or the amount of current to the low-voltage battery 42. That is, the ECU 50 calculates an amount of power needed to charge the voltage battery 42 based on the state of charge of the low-voltage battery 42 or the amount of current to the low-voltage battery 42. This configuration can prevent occurrence of a situation where there is insufficient power to be supplied to the accessories 43 when the low-voltage battery 42 is charged.

Fourth Embodiment

A fourth embodiment will now be described. Only differences of the fourth embodiment from the third embodiment will be described and description about the common configuration between the third and fourth embodiments is not provided in order to avoid repetition. Identical or equivalent components or components of equal or equivalent function are identified by the same or similar reference numerals.

In the fourth embodiment, continued to the third embodiment, a voltage conversion method performed by the converter 41 will now described. The battery loss in the high-voltage battery 30 is calculated by multiplying a square of an amount of current flowing through the high-voltage battery 30 by the battery resistance of the high-voltage battery 30. An amount of current flowing between the high-voltage battery 30 and the motor 20 and an amount of current flowing between the high-voltage battery 30 and the electrical loads 40 are superimposed. Thus, an increased peak value of current flowing through the high-voltage battery 30 may lead to a rapid increase in the battery loss. To reduce the battery loss, it is desirable to distribute an amount of current flowing between the high-voltage battery 30 and the motor 20 and an amount of current flowing between the high-voltage battery 30 and the electrical loads 40, thereby reducing the peak value. That is, it is desirable to separate a period of outputting power to the motor 20 and a period of outputting power to the electrical loads 40, thereby reducing the peak value of current flowing through the high-voltage battery 30.

As described in the first embodiment, to efficiently control the motor 20, the motor 20 may be operated intermittently. That is, a coasting period during which an amount of current (i.e., a charging/discharging amount) flowing between the motor 20 and the high-voltage battery 30 is zero or near zero may be set periodically.

In view of the above, in the fourth embodiment, when the motor 20 is operated intermittently, the conversion period is set within the coasting period, thereby reducing the peak value of current flowing through the high-voltage battery 30. To this end, the ECU 50 of the present embodiment includes additional functions.

Figure 19:
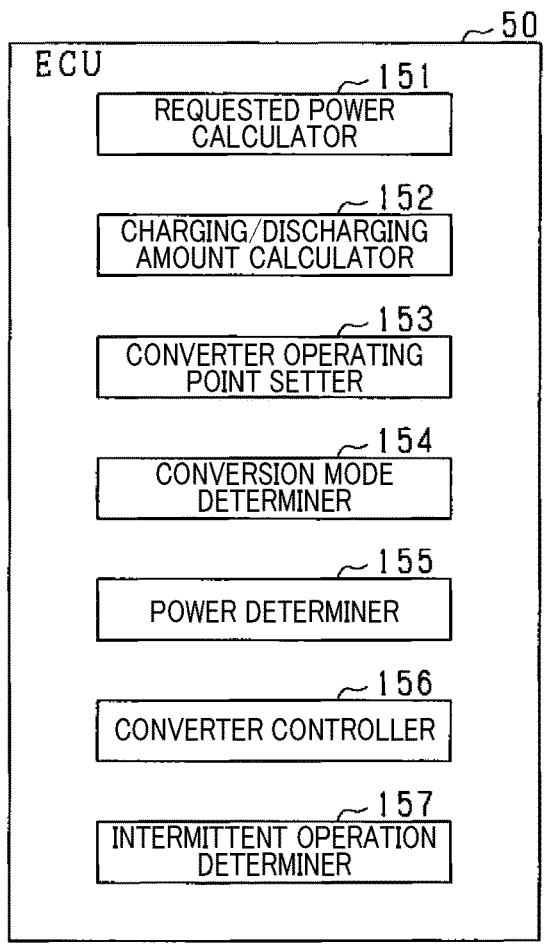
FIG. 19 is a functional block diagram of an ECU in accordance with a fourth embodiment.

As shown in FIG. 19, the ECU 50 includes, as functional blocks, a requested power calculator 151, a charging/discharging amount calculator 152, a converter operating point setter 153, a conversion mode determiner 154, a power determiner 155, a converter controller 156, and an intermittent operation determiner 157. In the fourth embodiment, the requested power calculator 151, the conversion mode determiner 154, the power determiner 155 are the same blocks as in the third embodiment and thus will not be redundantly described.

The intermittent operation determiner 157 is configured to determine whether or not the intermittent operation is being performed. For example, it is determined whether or not a decision has been made to perform the intermittent operation at step S104 of the motor control processing.

The charging/discharging amount calculator 152 of the fourth embodiment is configured to, if the intermittent operation is being performed, calculate the charging/discharging amount of the high-voltage battery 30 supplied from/to the motor 20 as being a predetermined value (e. g., zero in the present embodiment).

The converter operating point setter 153 of the fourth embodiment is configured to, if the intermittent operation is being performed, read or set the converter operating point map when the charging/discharging amount of the high-voltage battery 30 supplied from/to the motor 20 is the predetermined value (zero in the present embodiment).

The converter controller 156 of the fourth embodiment is configured to, if a decision is made to perform intermittent voltage conversion during the intermittent operation, determine a period of operating cycle having the motor driving period and the coasting period set therein, as a period of conversion cycle. The period of operating cycle is determined at step S106 in the motor control processing.

The converter controller 156 of the fourth embodiment is configured to, if a decision is made to perform the intermittent voltage conversion during the intermittent operation, determine the conversion period and the conversion suspension period based on the requested power and the output power of the converter 41 during the conversion period in a similar manner as in the third embodiment.

The determined conversion period may be longer than the coasting period. In such a case, the ECU 50 may increase the output current from the converter 41 (that is, decrease the power conversion efficiency) such that the conversion period is set equal to the coasting period. For a large amount of discharge current of the high-voltage battery 30 to the motor 20 or for a large amount of charge current from the motor 20 to the high-voltage battery 30, it is desirable to set the conversion period to be equal to the coasting period, thereby reducing the peak value of current flowing through the high-voltage battery 30.

Figure 20:
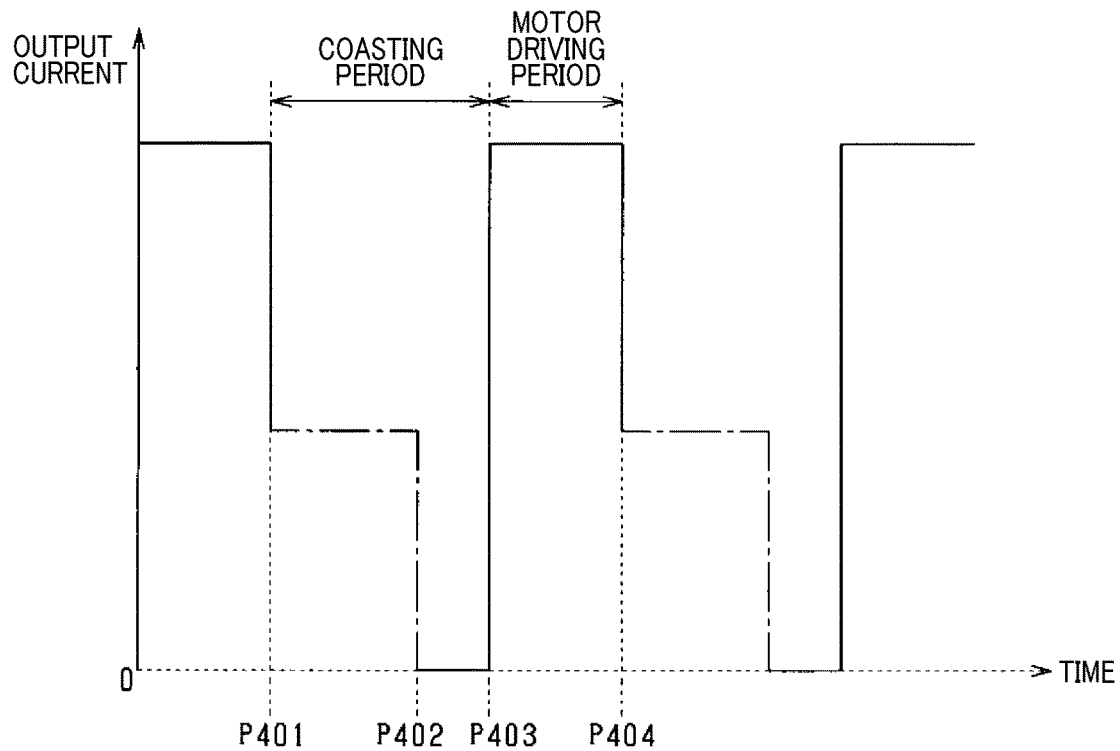
FIG. 20 is an example timing diagram of a conversion period and a conversion suspension period.

When performing the intermittent voltage conversion during the intermittent operation, the converter controller 156, as shown in FIG. 20, starts both the coasting period and the conversion period (time P401) and sets the conversion period (times P401 to P402) during the coasting period (times P401 to P403). After the end of the conversion period, the converter controller 156 sets the conversion suspension period (times P402 to P404). Thereafter, the converter controller 156 starts both the coasting period and the conversion period (time P404).

FIG. 20 illustrates an example output current flowing through the high-voltage battery 30, where the motor driving period is indicated by a solid line and the conversion period is indicated by a dashed-dotted line.

Figure 21:
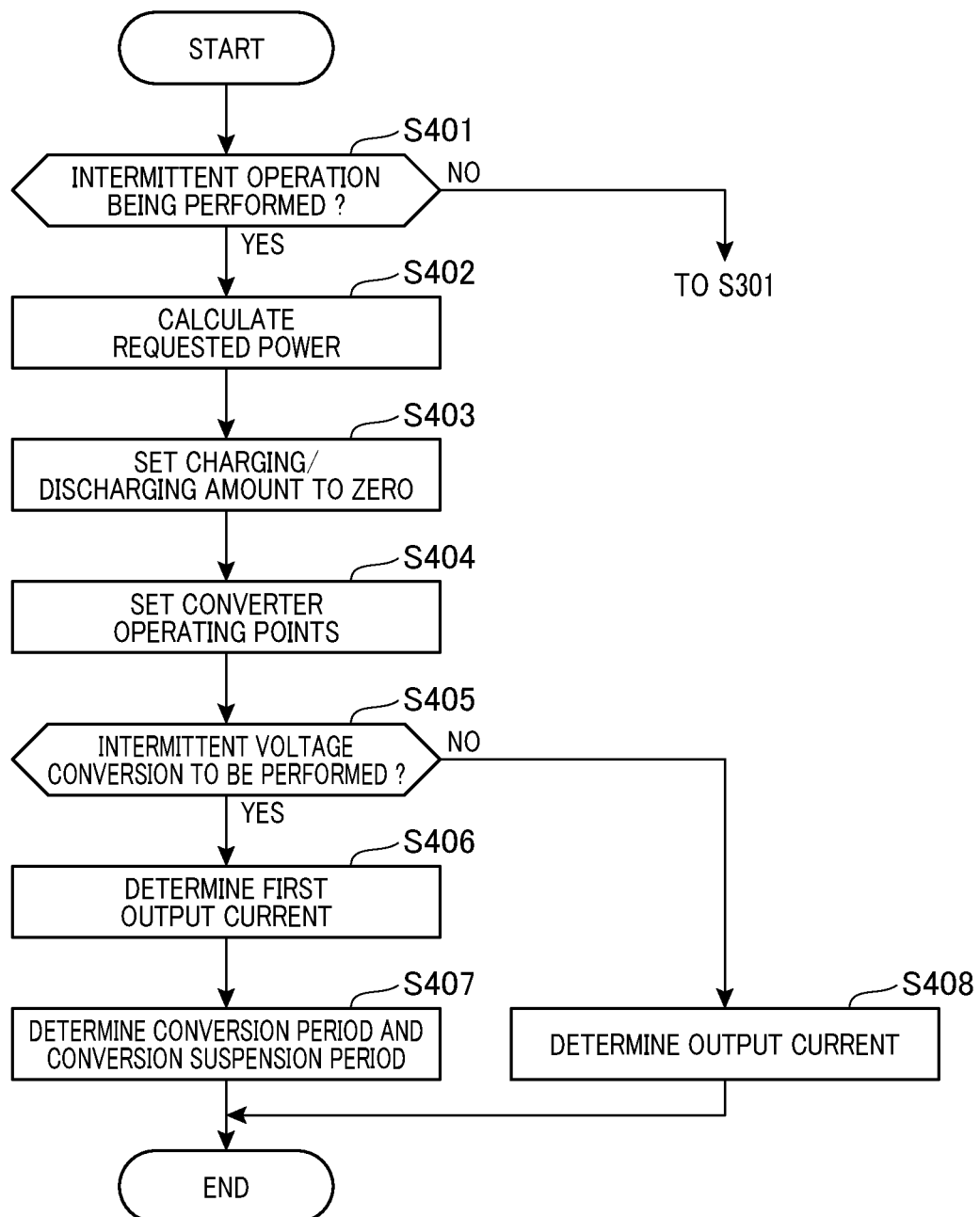
FIG. 21 is a flowchart of converter control processing.

Converter control processing of the fourth embodiment will now be described with reference to FIG. 21.

At step S401, the ECU 50 serves as the intermittent operation determiner 157 and determines whether or not the intermittent operation is being performed. If the answer is no at step S401, the process flow proceeds to step S301.

If the answer is yes at step S401, then at step S402 the ECU 50 serves as the requested power calculator 151 and calculates requested power to be supplied from the converter 41 to the electrical loads 40 based on states of the electrical loads 40.

At step S403, the ECU 50 serves as the charging/discharging amount calculator 152 and determines zero as a charging/discharging amount of the high-voltage battery 30 supplied from/to the motor 20.

At step S404, the ECU 50 serves as the converter operating point setter 153 and sets converter operating points that can specify the conversion efficiency and the output current of the converter 41 assuming that the charging/discharging amount of the high-voltage battery 30 supplied from/to the motor 20 is zero.

At step S405, the ECU 50 serves as the conversion mode determiner 154 and determines whether to perform the intermittent voltage conversion. If the answer is yes at step S405, then the ECU 50 decides to perform the intermittent voltage conversion. If the answer is no at step S405, then the ECU 50 decides to perform continuous voltage conversion.

If the answer is yes at step S405, then at step S406 the ECU 50 serves as the power determiner 155 and determines a first output current to be output by the converter 41 during the conversion period. At step S406, the ECU 50 determines the converter operating point of highest power conversion efficiency based on the converter operating points set at step S404. The ECU 50 determines the output current identified by the converter operating point of highest power conversion efficiency as the first output current to be output by the converter 41 during the conversion period. During the conversion suspension period, the ECU 50 decides to suspend the voltage conversion.

At step S407, the ECU 50 serves as the converter controller 156 and determines the period of conversion cycle, the conversion period, and the conversion suspension period. At step S407, the ECU 50 sets a period of operating cycle having the motor driving period and the coasting period set therein, as being a period of conversion cycle. Thereafter, the process flow of the converter control processing ends.

If the answer is no at step S405, then at step S408 the ECU 50 determines the output current from the converter 41 based on the requested power. Thereafter, the process flow of the converter control processing ends.

After the process flow of converter control processing ends, based on the information determined in the converter control processing, the ECU 50 performs the voltage conversion via the converter 41. That is, if the ECU 50 decides to perform the intermittent voltage conversion when the intermittent operation is being performed, the ECU 50 sets the conversion period at the start of the coasting period. The ECU 50 then directs the converter 41 to output the first output current determined at step S406 during the conversion period. The ECU 50 starts the conversion suspension period when the conversion period determined at step S407 has elapsed after the start of the conversion period. The ECU 50 directs the converter 41 to suspend the voltage conversion during the conversion suspension period. The ECU 50 starts both the conversion period and the coasting period when the conversion suspension period determined at step S406 has elapsed after the start of the conversion suspension period. Thereafter, the ECU 50 repeatedly executes these steps until the converter control processing is newly started.

If the ECU 50 decides to perform the continuous voltage conversion during the intermittent operation, the ECU 50 directs the converter 41 to output the output current determined at step S408 until the converter control processing is newly started.

The fourth embodiment set forth above can provide the following advantages.

When power is supplied to the electrical loads 40 while current is passing between the high-voltage battery 30 and the motor 20, An amount of current flowing between the high-voltage battery 30 and the motor 20 and an amount of current flowing between the high-voltage battery 30 and the electrical loads 40 are superimposed, which leads to an increased peak value of current flowing through the high-voltage battery 30. Since the battery loss is proportional to a square of the charge/discharge current of the rechargeable battery (that is the high-voltage battery 30), the battery loss rapidly increases with increasing peak value of charge/discharge current of the battery. Thus, considering the power supply system including the motor 20, the high-voltage battery 30, and the electrical loads 40 as a whole, the efficiency may decrease.

In view of the above, the ECU 50 is configured to set the conversion period while energization of the motor 20 is being suspended. More specifically, when the intermittent operation is performed such that the coasting period during which energization of the motor 20 is suspended (or energization current becomes vanishingly small) is periodically provided, the conversion period is set within the coasting period. This allows an energization period of the motor 20 and an energization period of the electrical loads 40 to be shifted from each other, which can reduce the peak value of current flowing through the high-voltage battery 30. This configuration can reduce the battery loss in the high-voltage battery 30, thereby enhancing the efficiency across the vehicle 10.

In the fourth embodiment, when the motor 20 is operated intermittently, at step S102 of the motor control processing, an amount of current flowing between the high-voltage battery 30 and the electrical loads 40 may be set to zero. Thereafter, steps S103 to S107 may be executed. With this configuration, a motor torque output during the motor driving period can be increased, which allows for efficient traveling of the vehicle.

Fifth Embodiment

A fifth embodiment will now be described. Only differences of the fifth embodiment from the fourth embodiment will be described and description about the common configuration between the fourth and fifth embodiments is not provided in order to avoid repetition. Identical or equivalent components or components of equal or equivalent function are identified by the same or similar reference numerals.

In the converter control processing of the fourth embodiment, if the answer is no at step S405, the ECU 50 decides to perform the continuous voltage conversion. However, even in such a case, it may be more advantageous to perform the intermittent voltage conversion in synchronization with the intermittent operation, thereby reducing the peak value of current flowing through the of the high-voltage battery 30. Particularly, when there is a large amount of current flowing between the high-voltage battery 30 and the motor 20, performing the intermittent voltage conversion in synchronization with the intermittent operation is more likely to increase the efficiency.

In view of the above, in the fifth embodiment, even when output power calculated based on the output current identified by the converter operating point of highest efficiency is below the requested power, the intermittent voltage conversion is performed in synchronization with the intermittent operation.

Figure 22:
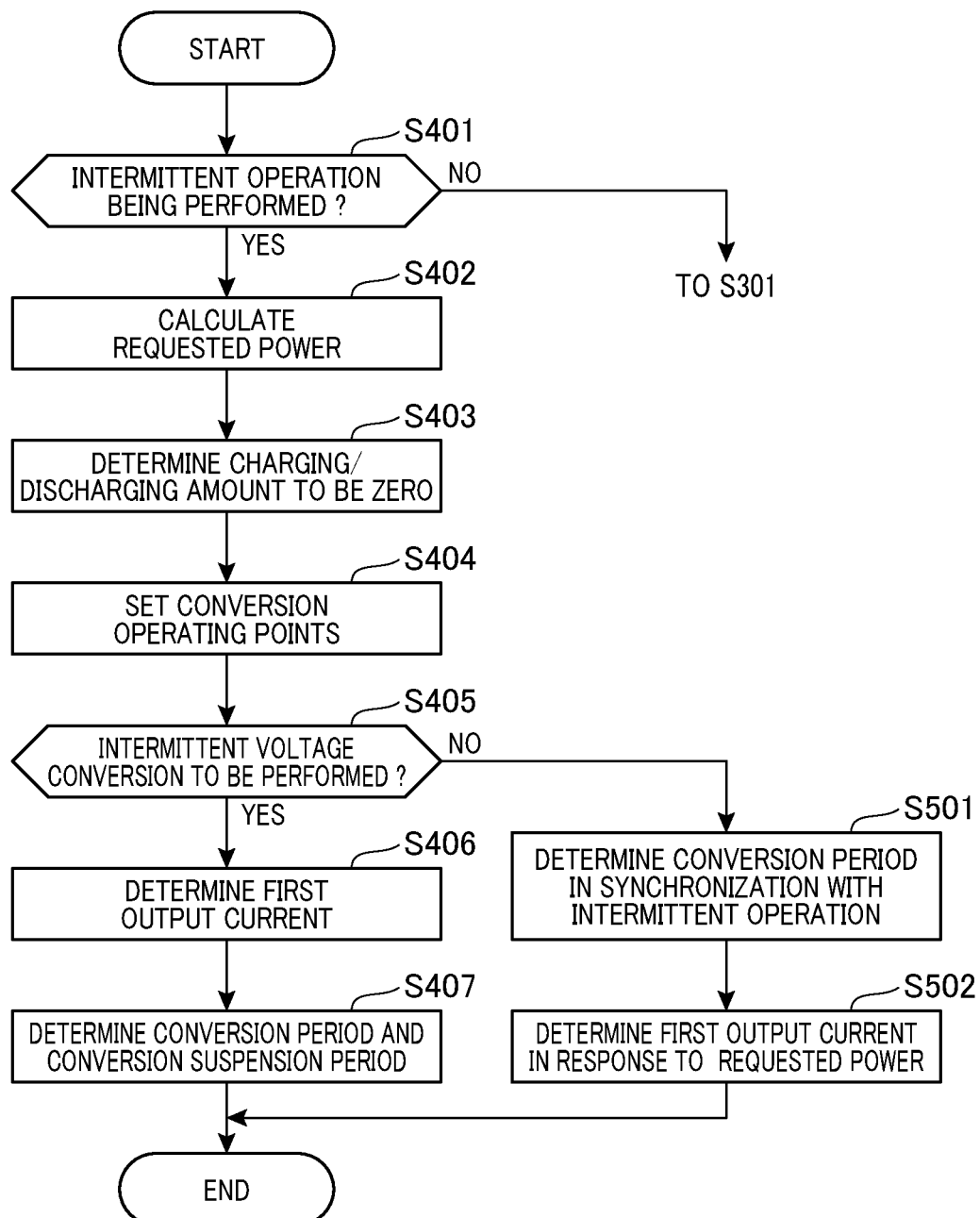
FIG. 22 is a flowchart of converter control processing in accordance with a fifth embodiment.

As shown in FIG. 22, if the answer is no at step S405, then at step S501 the ECU 50 serves as the converter controller 156 and decides to perform the intermittent voltage conversion in synchronization with the intermittent operation. At step S501, the converter controller 156 determines the period of operating cycle as being the period of conversion cycle, the coasting period as being the conversion period, and the motor driving period as being the conversion suspension period.

At step S502, the ECU 50 serves as the power determiner 155 and determines a first output current to be output by the converter 41 during the conversion period. At step S502, regardless of the power conversion efficiency, the ECU 50 determines the first output current to be output by the converter 41 during the conversion period according to the following equations (9) and (10), In the equations (9) and (10), T represents the period of operating cycle (=period of conversion cycle), Wr represents the requested power, T2 represents the coasting period (=the conversion period), Z1 represents the first output current, V1 represents an output voltage (=12V) from the converter 41, and T1 represents the motor driving period (=the conversion suspension period).

$$T \times Wr = T2 \times Z1 \times V1 \qquad (9)$$

$$T = T1 + T2 \qquad (10)$$

Thereafter, the process flow of the converter control processing ends. After the process flow of converter control processing ends, based on the information determined in the converter control processing, the ECU 50 performs the voltage conversion via the converter 41. That is, if at step S501 the ECU 50 decides to perform the intermittent voltage conversion in synchronization with the intermittent operation, the ECU 50 sets the conversion period within the coasting period. The ECU 50 directs the converter 41 to output the first output current determined at step S502 during the conversion period. When the conversion period determined at step S501 has elapsed after the start of the conversion period, that is, upon the start of the motor driving period, the ECU 50 sets the conversion suspension period. The ECU 50 directs the converter 41 to suspend the voltage conversion during the conversion suspension period. The ECU 50 starts the conversion period at the same timing as the start of the coasting period when the conversion suspension period determined at step S501 has elapsed after the start of the conversion suspension period. Thereafter, the ECU 50 repeatedly executes these steps until the converter control processing is newly started.

In the fifth embodiment, at step S501, the ECU 50 unconditionally decides to perform the intermittent voltage conversion in synchronization with the intermittent operation. In an alternative embodiment, the ECU 50 may be configured to perform the intermittent voltage conversion, with the proviso that the charging/discharging amount of the high-voltage battery 30 supplied from/to the motor 20 is equal to or greater than a predetermined amount of current. Desirably, the predetermined amount of current may be equal to or greater than an amount of current that is expected to provide electricity economy enhancing effects via performing the intermittent voltage conversion.

The fifth embodiment set forth above can provide the following advantages.

In the configuration of the fifth embodiment, even if the output power that is output with the highest power conversion efficiency is insufficient, the intermittent voltage conversion is performed in synchronization with the intermittent operation. This configuration can reduce the peak value of current flowing through the high-voltage battery 30 to reduce the battery loss, thereby enhancing electricity economy across the vehicle. In addition, regardless of the power conversion efficiency, the requested power is output, which can prevent occurrence of a situation where there is insufficient power for the requested power.

Modifications

Although specific embodiments have been described, one of ordinary skill in the art, in light of this teaching, can generate additional embodiments and modifications without departing from the spirit of or exceeding the scope of the claimed invention. In the following, identical or equivalent components or components of equal or equivalent function are identified by the same or similar reference numerals.

Figure 23:
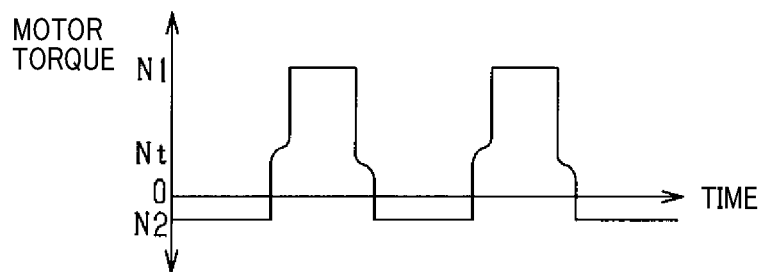
FIG. 23 is an example change over time in motor torque in accordance with a modification.

In an alternative embodiment to any one of the above embodiments, the ECU 50 may be configured to, when the motor torque is within a specific range including the motor torque corresponding to the drive shaft torque of zero during the transition period, an upper-limit may be set for a rate of change of the motor torque. For example, as shown in FIG. 23, the motor torque may be changed gradually. This enables slowly changing the motor torque and thus lessening the impact upon collision between the teeth as compared with when rapidly changing the motor torque. That is, a rotational speed of the drive shaft side gear relative to the motor side gear can be reduced, thereby lessening the impact upon collision between the teeth.

In the embodiments, there may be a rotational speed of the motor 20 at which a low impact upon collision between the teeth based on backlash or low collision noise is experienced. In an alternative embodiment to any one of the above embodiments, the ECU 50 may be configured to set no transition period if the rotational speed of the motor 20 is below a threshold. This can eliminate a need for setting the third torque, thereby reducing power consumption of the motor 20.

In the second embodiment, during the transition period, the third torque may be a motor torque corresponding to the drive shaft torque of zero.

(M1) In an alternative embodiment to any one of the above embodiments, battery losses based on charge/discharge current of the low-voltage battery 42 may be taken into account. That is, the system efficiency map or the voltage conversion efficiency map may be created taking into account battery losses based on charge/discharge current of the low-voltage battery 42.

(M2) In an alternative embodiment to any one of the above embodiments, supply of power to the electrical loads 40 may be suspended during the motor driving period. The battery loss in the high-voltage battery 30 is proportional to a square of current. Therefore, preventing an increase in peak value may lead to increased electricity economy. In such an embodiment, electrical power supply from the low-voltage battery 42 to the accessories 43 may be continued.

In an alternative embodiment to any one of the above embodiments, a current sensor for measuring an amount of current flowing through the high-voltage battery 30 may be provided, and operating points may be set based on the amount of current measured by the current sensor. As an example, a current sensor may be provided along an electric path between the electrical loads 40 and the high-voltage battery 30, and motor operating points may be set based on the amount of current measured by the current sensor. As another example, a current sensor may be provided along an electric path between the motor 20 and the high-voltage battery 30, and converter operating points may be set based on the amount of current measured by the current sensor.

(M3) In the above embodiments, a determination as to whether to provide the transition period during which the third torque is output between the motor driving period and the coasting period is made based on the first torque and the second torque. In an alternative embodiment, a determination as to whether to provide the transition period during which the third torque is output between the motor driving period and the coasting period may be made based on at least one of the first torque and the second torque. For example, in a case where it is predetermined that the second torque is zero or near zero, a determination may be made as whether or not the motor torque corresponding to the drive shaft torque of zero is present between the first torque and zero.

(M4) In the above embodiments, the motor torque corresponding to the drive shaft torque of zero (friction torque) is set responsive to the rotational speed. In an alternative embodiment, the motor torque corresponding to the drive shaft torque of zero (friction torque) may be set to a fixed value.

(M5) In the above embodiments, the ECU 50 may suspend energization of the motor 20 during the coasting period. Suspending energization of the motor 20 during the coasting period can further reduce the power consumption. If energization of the motor 20 is suspended during the coasting period, the rotary shaft of the motor 20 mechanically coupled to the axles 23 will continue to rotate and a counter electromotive force (EMF) will thus occur in the motor 20, which may cause a negative torque. The counter electromotive force and the negative torque accompanied therewith increase with increasing rotational speed of the motor 20. Thus, when the rotational speed exceeds a predetermined speed of the motor 20, the inverter 25 may malfunction.

Figure 24:
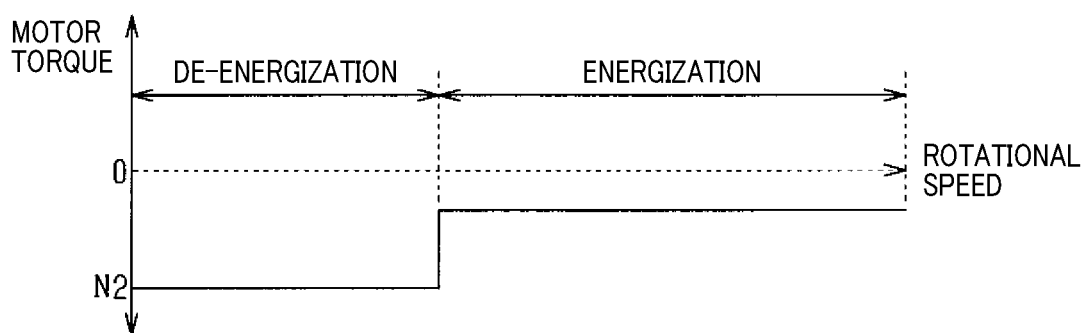
FIG. 24 is an example relationship between rotational speed and second torque in accordance with a modification.

In view of the above, in an alternative embodiment to any one of the above embodiments, preferably, as shown in FIG. 24, the ECU 50 may be configured to, during the coasting period, suspend energization of the motor 20 if the rotational speed of the motor 20 is less than a predetermined speed, and energize the motor 20 if the rotational speed of the motor 20 is equal to or greater than the predetermined speed. The predetermined speed is a speed at which the inverter 25 may malfunction due to occurrence of the counter electromotive force, and may be determined by performance of the inverter 25. More specifically, if the rotational speed is equal to or greater than the redetermined speed, the motor 20 may be energized such that the second torque becomes zero.

Figure 25:
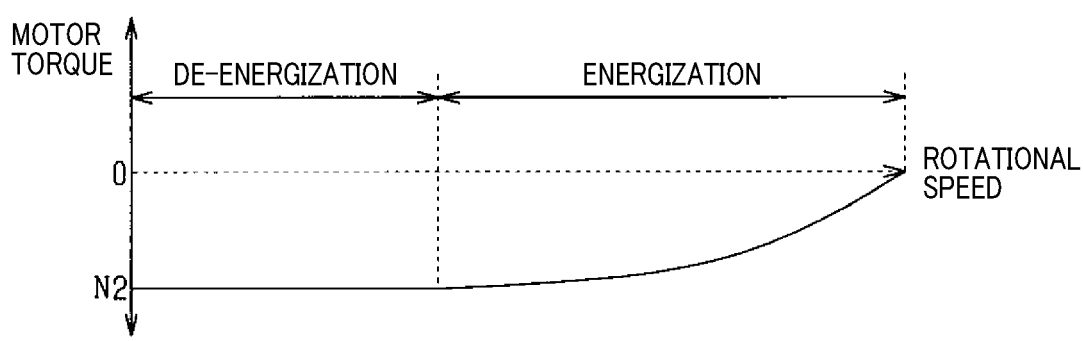
FIG. 25 is an example relationship between rotational speed and second torque in accordance with a modification.

As shown in FIG. 25, the ECU 50 may be configured to determine an amount of current to the motor 20 as a function of the rotational speed if the rotational speed is equal to or greater than a predetermined speed, and energize the rotary electric machine at the determined amount of current. That is, if the rotational speed is equal to or greater than the predetermined speed, an amount of current to the motor 20 may be determined as a function of the rotational speed to lower the motor torque unless the inverter 25 malfunctions, which can prevent the inverter 25 from malfunctioning while suppressing the power consumption of the motor 20 and the inverter 25.

In the above embodiments, causing the motor 20 not to brake or drive the vehicle may include at least one of de-energization of the motor 20 and setting the output torque of the motor 20 to zero or near zero.

In an alternative embodiment to any one of the above embodiments, a high-voltage accessory as a second electrical load, to which the output voltage of the high-voltage battery 30 is input, may be connected to the high-voltage battery 30. In such an embodiment, preferably, the amount-of-current calculator 52 may be configured to calculate an amount of current flowing through the high-voltage battery 30 including an amount of current flowing through the high-voltage battery 30 for supply of power to the high-voltage accessory. Likewise, preferably, the charging/discharging amount calculator 152 may be configured to calculate a charging/discharging amount of the high-voltage battery 30 including a discharging amount of the high-voltage battery 30 for supply of power to the high-voltage accessory.

In an alternative embodiment to any one of the above embodiments, the converter 41 may be a boost converter. In such an embodiment, an input voltage of the electrical loads 40 becomes higher than an output voltage of the high-voltage battery 30. In another embodiment, a boost converter may be provided between the high-voltage battery 30 and the inverter 25.

In an alternative embodiment to any one of the above embodiments, an electric charge storage device, such as a capacitor or the like, may be connected to the low-voltage battery 42, which can reduce an amount of current flowing through the high-voltage battery 30 and thus reduce the battery loss.

In the above embodiments, the motor 20 is controlled to operate at the motor operating point of highest efficiency. In an alternative embodiment to any one of the above embodiments, the motor 20 may be controlled to operate at any motor operating point of higher efficiency than the system efficiency of a motor operating point at which the continuous operation of the motor 20 is performed. Likewise, the converter 41 is controlled to operate at the converter operating point of highest efficiency. In an alternative embodiment to any one of the above embodiments, the converter 41 may be controlled to operate at any converter operating point of higher efficiency than the power conversion efficiency of a converter operating point at which continuous voltage conversion is performed.

The above embodiments can be applicable to vehicles including an internal-combustion engine, for example, hybrid vehicles.

In an alternative embodiment to any one of the above embodiments, the map may be corrected by a state (an output voltage, a state of charge, and/or a temperature) of the high-voltage battery 30, a temperature of the motor 20 or the like. That is, the motor operating point and the converter operating point may be corrected by a state (an output voltage, a state of charge, and/or a temperature) of the high-voltage battery 30, a temperature of the motor 20 or the like.

In an alternative embodiment to any one of the above embodiments, when a brake is operated, the intermittent operation may be determined not be performed.

In an alternative embodiment to any one of the above embodiments, an amount of current flowing between the high-voltage battery 30 and the motor 20 and an amount of current flowing between the high-voltage battery 30 and the electrical loads 40 may be calculated. The motor operating point and the converter operating point may be set based on these calculated amounts of current. In such an embodiment, the system efficiency map and the power conversion efficiency map may be created depending on the amounts of current and stored.

In an alternative embodiment to any one of the above embodiments, the motor torque corresponding to the drive shaft torque of zero may be corrected by a temperature of lubricant used for gears or like.

Figure 26:
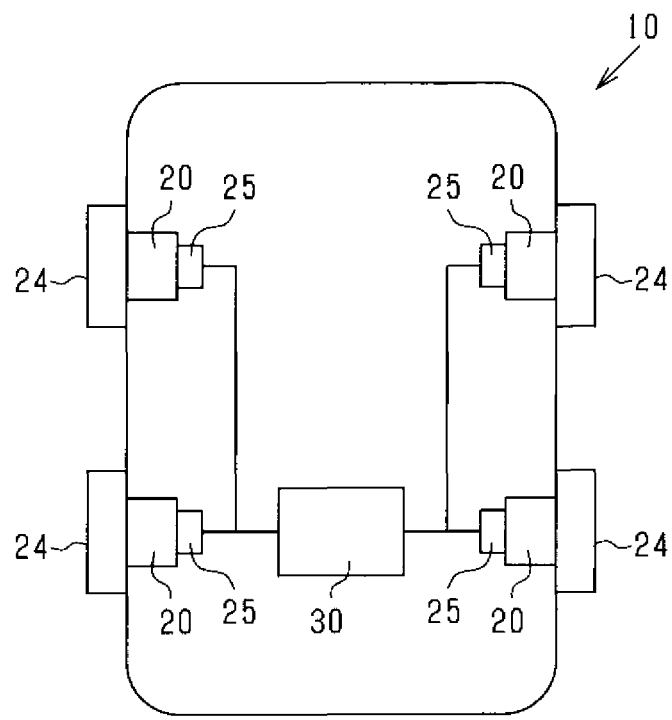
FIG. 26 is a schematic diagram of a vehicle in accordance with a modification.
Figure 27:
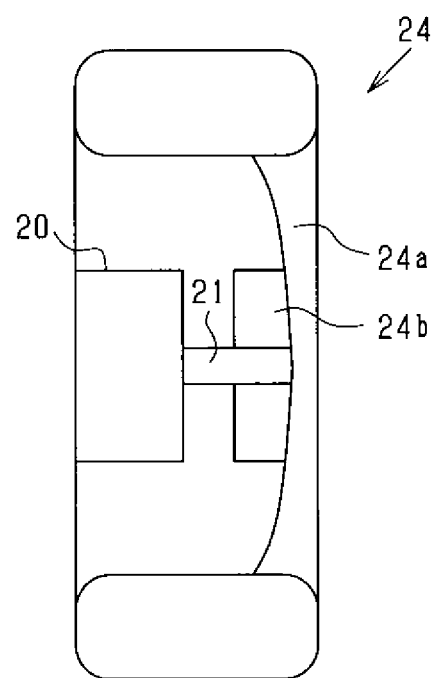
FIG. 27 is a schematic diagram of a vehicle in accordance with a modification.

Any one of the above embodiments may be applied to an in-wheel motor vehicle having the motor 20 incorporated in a wheel 24*a* of each drive wheel 24 as shown in FIG. 26. More specifically, as shown in FIG. 27, a direct drive approach may be employed, where the rotary shaft 21 of the motor 20 is coupled to the hub 24*b* of the wheel 24*a* via splined intermeshing without using the speed reducer 22. Even in such a direct drive approach, a transition period may be provided when performing the intermittent operation because there is backlash between the rotary shaft 21 and the hub 24*b* of the wheel 24*a*.

In the above embodiments, vehicle drive types may include, but are not limited to, two-wheel drive, and four-wheel drive.

In the above embodiments, the motor (20) may be any one of a synchronous three-phase alternating-current (AC) motor, a synchronous electric motor, an alternating-current (AC) motor, and a direct-current (DC) motor.

In the above embodiments, the motor driving period and the coasting period are periodically alternated. In an alternative embodiment, the motor driving period and the coasting period may be non-periodically alternated, for example, with a variable periodicity.

What is claimed is:

1. An apparatus for controlling a motorized vehicle, the motorized vehicle being equipped with a main rechargeable battery, and electrical loads electrically are connected to the main rechargeable battery via a voltage converter, the apparatus comprising:

a processor programmed to:
calculate a charging/discharging amount of the main rechargeable battery;
when current is passing between the main rechargeable battery and the electrical loads, set operating points of the voltage converter based on the charging/discharging amount of the main rechargeable battery, each of the operating points specifying (i) a power conversion efficiency representing a ratio of input power to the electrical loads to output power of the main rechargeable battery and (ii) an output current of the voltage converter;
based on the operating points set by the converter operating point setter, cause the voltage converter to convert a voltage of the main rechargeable battery and supply power to the electrical loads;
perform intermittent voltage conversion by periodically alternating between a conversion period during which the voltage of the main rechargeable battery is converted by the voltage converter and a conversion suspension period during which voltage conversion by the voltage converter is suspended, such that output power from the voltage converter during one period of conversion cycle including the conversion period and the conversion suspension period is set equal to requested power of the electrical loads during the one period of conversion cycle; and during the conversion period for the intermittent voltage conversion, perform voltage conversion at an operating point of the set operating points having a higher power conversion efficiency as compared with when voltage conversion is performed continuously without being suspended.

2. The apparatus according to claim 1, wherein:

the electrical loads include an accessory electrically connected to the main rechargeable battery via the voltage converter and an accessory-side rechargeable battery electrically connected to the main rechargeable battery via the voltage converter and electrically connected to the accessory, and the processor is programmed to:

calculate requested power based on at least a drive state of the accessory, and when performing the intermittent voltage conversion, determine the conversion period and the conversion suspension period based on the calculated requested power and the electrical power output from the voltage converter.

3. The apparatus according to claim 2, wherein the processor is programmed to calculate the requested power based on the drive state of the accessory and an amount of current flowing through the accessory-side rechargeable battery.

4. The apparatus according to claim 2, wherein the processor is programmed to calculate the requested power based on the drive state of the accessory and a state of charge of the accessory-side rechargeable battery.

5. The apparatus according to claim 1, wherein:

the motorized vehicle includes a rotary electric machine electrically connected to the main rechargeable battery, the rotary electric machine is intermittent-operation enabled such that a period of energization, in which the rotary electric machine is energized, and a period of de-energization, in which the rotary electric machine is de-energized, are periodically alternated in intermittent operation, and when the rotary electric machine is operated intermittently, the processor is programmed to set the conversion period within the period of de-energization of the rotary electric machine.

6. The apparatus according to claim 1, wherein:

the motorized vehicle includes a rotary electric machine electrically connected to the main rechargeable battery, the rotary electric machine is intermittent-operation enabled such that a period of energization, in which the rotary electric machine is energized, and a period of de-energization, in which the rotary electric machine is being de-energized, are periodically alternated during intermittent operation, the processor is further programmed to:

calculate requested power based on states of the electrical loads; and calculate whether the requested power is greater than a predetermined value, and perform intermittent voltage conversion by periodically alternating between a conversion period during which the voltage of the main rechargeable battery is converted by the voltage converter and a conversion suspension period during which voltage conversion by the voltage converter is suspended, and when the rotary electric machine is operated intermittently, set the conversion period within the period of de-energization of the rotary electric machine, the predetermined value is a value of power output by the voltage converter during the voltage conversion performed at the operating point of highest power conversion efficiency, among the operating points set by the converter operating point setter, during the period of de-energization of the rotary electric machine, and the processor is programmed to, upon determining that the requested power is greater than the predetermined value, determine the output current of the voltage converter based on the conversion period and the requested power, and cause the voltage converter to convert the voltage of the main rechargeable battery at the determined output current.

7. The apparatus according to claim 1, wherein:

the main rechargeable battery is electrically connected to a rotary electric machine that a same voltage as an output voltage of the main rechargeable battery is input to or output from, and the charging/discharging amount of the main rechargeable battery is determined based on input power to or output power from the rotary electric machine.

* * * * *